United States Patent
Margulis

(10) Patent No.: US 8,019,883 B1
(45) Date of Patent: Sep. 13, 2011

(54) WIFI PERIPHERAL MODE DISPLAY SYSTEM

(75) Inventor: Neal D. Margulis, Woodside, CA (US)

(73) Assignee: Digital Display Innovations, LLC, Woodside, CA (US)

( * ) Notice: Subject to any disclaimer, the term of this patent is extended or adjusted under 35 U.S.C. 154(b) by 898 days.

(21) Appl. No.: 11/230,872

(22) Filed: Sep. 19, 2005

Related U.S. Application Data

(63) Continuation-in-part of application No. 11/122,457, filed on May 5, 2005, now Pat. No. 7,667,707, and a continuation-in-part of application No. 11/139,149, filed on May 27, 2005.

(60) Provisional application No. 60/705,153, filed on Aug. 4, 2005.

(51) Int. Cl.
*G06F 15/16* (2006.01)

(52) U.S. Cl. ........ 709/231; 709/204; 709/217; 715/240; 370/450

(58) Field of Classification Search ............. 709/204, 709/231
See application file for complete search history.

(56) References Cited

U.S. PATENT DOCUMENTS

| | | | |
|---|---|---|---|
| 5,602,589 A | 2/1997 | Vishwanath | |
| 5,708,961 A | 1/1998 | Hylton | |
| 5,850,482 A | 12/1998 | Meaney | |
| 5,852,437 A | 12/1998 | Wugofski | |
| 5,909,518 A | 6/1999 | Chui | |
| 5,911,582 A | 6/1999 | Redford | |
| 5,977,933 A | 11/1999 | Wicher | |
| 6,031,940 A * | 2/2000 | Chui et al. | 382/240 |
| 6,075,906 A | 6/2000 | Fenwick | |
| 6,097,441 A * | 8/2000 | Allport | 348/552 |
| 6,104,334 A | 8/2000 | Allport | |
| 6,141,059 A | 10/2000 | Boyce | |
| 6,141,447 A | 10/2000 | Linzer | |
| 6,222,885 B1 | 4/2001 | Chaddha | |
| 6,256,019 B1 | 7/2001 | Allport | |
| 6,263,503 B1 | 7/2001 | Margulis | |
| 6,323,854 B1 * | 11/2001 | Knox et al. | 345/418 |
| 6,340,994 B1 | 1/2002 | Margulis | |
| 6,409,602 B1 | 6/2002 | Wiltshire | |
| 6,437,803 B1 | 8/2002 | Panasyuk | |
| 6,456,340 B1 | 9/2002 | Margulis | |
| 6,510,177 B1 | 1/2003 | De Bonet | |
| 6,600,838 B2 | 7/2003 | Chui | |
| 6,611,530 B1 | 8/2003 | Apostolopoulos | |
| 6,628,716 B1 | 9/2003 | Tan | |

(Continued)

OTHER PUBLICATIONS

Skodras et al., "JPEG2000: The Upcoming Still Image Compression Standard," May 11, 2000, 14 pages.

(Continued)

*Primary Examiner* — Jude J Jean-Gilles
*Assistant Examiner* — Jaren Means
(74) *Attorney, Agent, or Firm* — Eppa Hite

(57) ABSTRACT

A wireless peripheral mode is provided by a host system that communicates to a WiFi infrastructure and, utilizing the same WiFi RF subsystem, also communicates to peripherals. The host system may employ additional RF channels for communicating with high bandwidth peripherals, such as display devices, where high levels of QoS may be managed locally. The host system may be a conventional desktop computer system, a notebook computer system, a multi-media access point, a cell phone, a game machine, a portable game machine, a Personal Digital Assistant (PDA), a smart phone or any other type of device that benefits from accessing both a WiFi infrastructure and local peripherals.

5 Claims, 9 Drawing Sheets

U.S. PATENT DOCUMENTS

| | | | |
|---|---|---|---|
| 6,658,019 B1 | 12/2003 | Chen | |
| 6,701,380 B2 | 3/2004 | Schneider | |
| 6,721,837 B2 | 4/2004 | MacInnis et al. | |
| 6,754,266 B2 | 6/2004 | Bahl | |
| 6,757,851 B1 | 6/2004 | Park | |
| 6,768,775 B1 | 7/2004 | Wen | |
| 6,771,828 B1 | 8/2004 | Malvar | |
| 6,774,912 B1 | 8/2004 | Ahmed | |
| 6,781,601 B2 | 8/2004 | Cheung | |
| 6,785,700 B2 | 8/2004 | Masud | |
| 6,798,838 B1 | 9/2004 | Ngo | |
| 6,807,308 B2 | 10/2004 | Chui | |
| 6,816,194 B2 | 11/2004 | Zhang | |
| 6,826,242 B2 | 11/2004 | Ojard | |
| 6,834,123 B2 | 12/2004 | Acharya | |
| 6,839,079 B2 | 1/2005 | Barlow | |
| 6,842,777 B1 | 1/2005 | Tuli | |
| 6,847,468 B2 | 1/2005 | Ferriere | |
| 6,850,571 B2 | 2/2005 | Tardif | |
| 6,850,649 B1 | 2/2005 | Malvar | |
| 6,853,385 B1 | 2/2005 | MacInnis | |
| 6,868,083 B2 | 3/2005 | Apostolopoulos | |
| 6,898,583 B1 | 5/2005 | Rising | |
| 2004/0090924 A1* | 5/2004 | Giaimo et al. | 370/252 |
| 2005/0165916 A1* | 7/2005 | Cromer et al. | 709/220 |
| 2006/0015621 A1* | 1/2006 | Quinn | 709/227 |
| 2006/0050729 A1* | 3/2006 | Chen et al. | 370/450 |

OTHER PUBLICATIONS

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

Luk Verboven, "Wireless Technology Update," Anixter Technology Group, 5 page, Mar. 2004, reprints from Network World, Mar. 29, 2004 and unattributed.

Bejerano et al., "A Framework for Fairness and QoS Assurance in Current IEEE 802.11 Networks . . . " IEEE INFOCOM 2004, 12 pages, Bell Labs, Murray Hill NJ.

Lindgren et al., "Quality of Service Schemes for IEEE 802.11," 7 pages, Lulea University of Technology, Lulea, Sweden.

Godfrey, "Inside 802.11e: Making QoS a Reality over WLAN Connections," GlobespanVirata, Dec. 19, 2003, 8 pages, http://www.commsdesign.com/showArticle.jhtml?articleID=17000388.

* cited by examiner

WIFI PERIPHERAL MODE DISPLAY SYSTEM

This application is a Continuation-in-Part of U.S. application Ser. No. 11/122,457 filed May 5, 2005 now U.S. Pat. No. 7,667,707 and of U.S. application Ser. No. 11/139,149 filed May 27, 2005, and claims the benefit of U.S. Provisional Application No. 60/705,153 filed Aug. 4, 2005.

BACKGROUND OF THE INVENTION

1. Field of the Invention

The present invention relates generally to a computer system for wirelessly connecting peripheral devices and more particularly to methods for wirelessly connecting a host computer to supporting WiFi peripherals and for wirelessly supporting additional display systems.

2. Description of the Background Art

In recent years, there has been growing popularity for the WiFi standard for wireless communication. WiFi is a collection of standards of which the main standards are 802.11g (which incorporates 802.11b) and 802.11a. Within the WiFi standard there are numerous required and optional modes as well as a continually advancing set of enhancements and proposed enhancements. WiFi can be found in practically every new portable computer and in an increasing number of desktop computers, telephones, televisions, digital media players and cellular phones. WiFi based Local Area Networks (WLANs) are found in most airports, coffee shops, businesses, college campuses, city centers and an increasing number of other areas.

Developing effective methods for operating wireless electronic peripherals is a significant challenge for modern system designers. In a typical system, wireless peripherals, such as a keyboard and mouse, use dedicated RF chips with their own RF channels to communicate with a computer. This adds cost to the computer system and if, as is typical, the computer does not integrate the RF chips for peripheral devices, requires the use of an external dongle.

Recently, computers and cell phones have utilized the Bluetooth standard for supporting a variety of peripherals including keyboards, mice and telephone headsets. Bluetooth is a more general standard that is more readily integrated directly into computers and cell phones. However, Bluetooth still adds a dedicated RF subsystem and since Bluetooth uses the same RF spectrum as WiFi's 802.11g, additional care must be taken to avoid interference between the two. Other power or cost sensitive devices, such as the Sony Play Station Portable (PSP) may include only a WiFi RF subsystem and the most convenient method for adding wireless peripherals is to provide wireless peripherals supporting WiFi.

A device such as a computer on a WiFi network has two modes of operation, Infrastructure mode and Ad-Hoc mode. Infrastructure mode allows the computer to communicate with the Access Points (AP) of a WiFi network and gain access to services such as Internet. Ad-Hoc mode allows devices to talk directly to each other without utilizing the APs. These modes are mutually exclusive so a device can not talk to both an AP and another device during the same session.

Mesh Networking is a technique for wireless communications where, instead of a conventional hub-and-spoke model with every device connecting to a central access point, every device (area) acts as a repeater or router. When mesh-enabled devices are in range of one another they automatically create a wireless mesh network, and traffic hops from device to device until it reaches the nearest AP that includes wired backhaul. Mesh networking reduces the need for more powerful central AP antennas and improves wireless coverage. One downside of mesh networking is that it increases the minimum processing capability needed by each mesh device. While add mesh capability typically would not be a problem for a computer, adding conventional mesh capability for peripherals and in particular for low cost battery based peripherals is a large burden.

For high bandwidth and time critical communication, such as between a computer and a computer display, it may be particularly desirable to add RF capacity beyond the RF channel used for WiFi infrastructure. If the more general network traffic is not normally part of the same RF channel then such a channel can operate in a high QoS mode. Options for the additional RF channel may include an additional channel of WiFi (WiFi supports multiple non-overlapping channels), a WiFi channel in a different RF band (802.11a operates in the 5 GHz spectrum while 802.11g operates in the 2.4 GHz spectrum) or a different RF protocol such as Ultra Wide Band (UWB).

Adding additional RF channels to the host system is best done for peripheral devices that need high bandwidth and high QoS. For low bandwidth low cost peripherals it is not desirable to either add additional RF channels or increase the complexity of the WiFi features. However, standard WiFi does not support a host system that can concurrently operate a single WiFi channel for both infrastructure mode and peripheral support. Therefore, what is needed is an effective Wireless architecture where a host system can maintain the best available mode of access to the WiFi AP infrastructure while concurrently utilizing low cost peripherals which also use the WiFi RF channel where any additional RF channels added to the system are used for high performance connections.

SUMMARY OF THE INVENTION

The present invention provides a method for implementing a "peripheral mode" or "WiFi-P mode" for wireless systems where a host system can maintain the best available mode of access to the WiFi AP infrastructure while concurrently utilizing low cost peripherals which also use the WiFi RF channel. Additionally, the host system may employ additional RF channels for communicating with high bandwidth peripherals, such as display devices, where high levels of QoS may be managed locally. The host system may be a conventional desktop computer system, a notebook computer system, a multi-media access point, a cell phone, a (portable) game machine, a Personal Digital Assistant (PDA), a smart phone or any other type of device that benefits from accessing both a WiFi infrastructure and local peripherals.

Each host system may utilize whichever capabilities of the WiFi infrastructure mode device that it chooses. For example, the host may support advanced operating modes, such as the Point Coordination Function (PCF) or extensions to the standard such as 802.11n for Multiple Input and Multiple Output (MIMO) antennas, 802.11e for QoS, or for extending the reach of the WiFi network with repeater capabilities or extensions such as 802.11s for mesh capabilities. While operating in what the invention refers to as "WiFi-Peripheral" (WiFi-P) mode, the peripheral devices, without directly utilizing the WiFi AP infrastructure, communicate with the host system. Simpler devices such as a keyboard or mouse may be designed to use only the WiFi-P mode to communicate with a host, and could not communicate with a WiFi infrastructure device which did not host a WiFi-P mode. More sophisticated devices such as a wireless display may support standard WiFi modes, WiFi-P modes, modes which include additional RF channels, or some combination of modes. Other enhancements for low power operation of peripherals are also supported.

Therefore, the present invention effectively implements a flexible wireless system that utilizes various heterogeneous components to facilitate optimal system interoperability and functionality. The present invention thus effectively and efficiently implements an enhanced wireless peripheral mode.

DETAILED DESCRIPTION OF THE PREFERRED EMBODIMENT

The present invention relates to an improvement for a wireless peripheral system. While the described embodiments relate to a host computer system, the same principles and features could be equally applied to host cell phone, host MP3 player and host media system.

Figure 1:
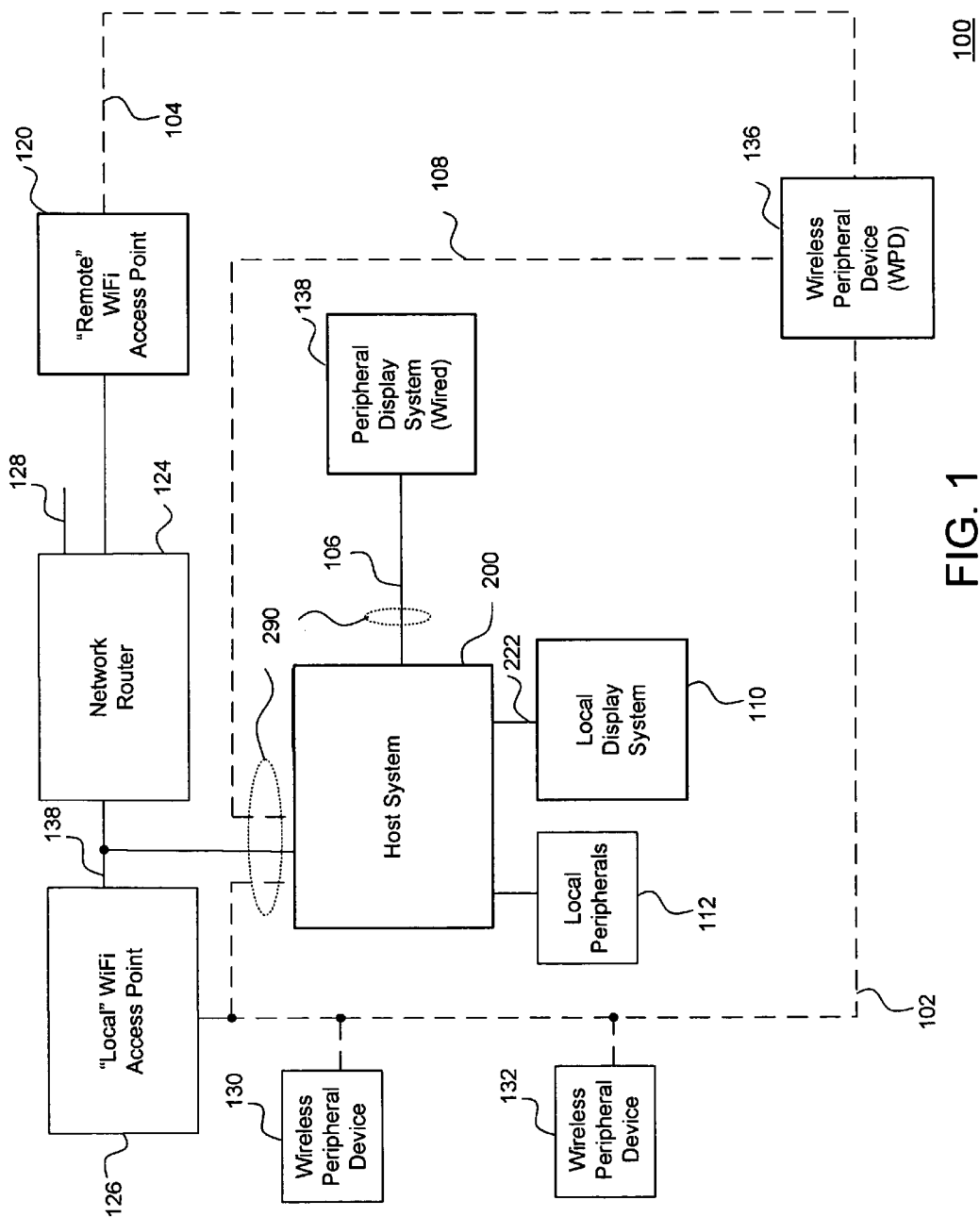
FIG. 1 is a block diagram of a wireless peripheral system including a host system connected over one or more networks to various peripherals and network elements.

Referring to FIG. 1, the invention provides an architecture for a wireless peripheral system 100 to make use of wireless peripherals 130, 132 and 136. A host system 200 may be connected via a wired connection 138 to a network 128 or may be part of a wireless network 102. A wired network 128 may be a conventional wired Ethernet network or another wire technology such as COAX or power line. In any of those cases, the network interface of host system 200 is managed by a Physical (PHY) interface as well as a network controller that is capable of supporting the protocols associated with the physical interface. In addition to or instead of a wired network interface, the host system 200 may be part of a wireless network 102 that may conform to elements of the WiFi standards. WiFi is a general term encompassing detailed specifications for different versions such as 802.11g and 802.11a which operate in different bands, as well as an ongoing list of enhancements to each specification including 802.11e, n, s and future derivatives.

As part of a WiFi network, the host system 200 communicates to a local WiFi Access Point 126 which may include a router or may use a separate network router 124. The router may include access to the Internet via a connection to a Wide Area Network (WAN) or may include a Local Area Network (LAN) connection 128 to an external modem (not shown) that provides a WAN connection.

The network router 124 may include a wireless interface or may support additional "Remote" WiFi Access Point(s) (APs) 120. The Remote WiFi Access Point 120 may operate with a different protocol in a different RF band than the local WiFi Access Point 126, may operate within the same band on a different channel, or may operate on the same channel if the distance between the access points is sufficient.

The host system 200 may include a variety of local peripherals 112 (a keyboard or mouse) that are connected over specific interfaces such as over a serial port, or a more general wired interface such as a Universal Serial Bus (USB) port or a 1394 port (not shown). A local display system 110 may be connected over a variety of high speed wired connections 222 such as Digital Video Interface (DVI), High Definition Multimedia Interface (HDMI) or another electrical or optical interface for transmitting uncompressed video data to a display device to the host system 200. The host system may also include interfaces for networked peripherals that are separate from the primary network interface used for the host system to access the Internet. Such an example would be a second Gigabit Ethernet connection 106 to a peripheral display system 138, or an Ultra Wide Band wireless interface 108 to a Wireless Peripheral Device 136.

The host system 200 may also include dedicated wireless links to Wireless Peripheral Devices (WPDs) 130 and 132 that may be completely separate from the WiFi network or to varying degrees part of the WiFi network. Such examples are wireless keyboards, mice and headsets that may use either proprietary wireless solutions or may use Bluetooth. Dedicated wireless solutions may be designed for very low power operation and may be tuned to the application and for very high battery life for the wireless peripheral device. Since a WPD such as a keyboard or mouse is low bandwidth, and does not typically need network services, there is a significant advantage to not including a standard WiFi interface in such a device. Although some host systems may be designed to include proprietary wireless solutions, it is typically necessary to include a dongle in the form of an external block connected over a USB port to the host. Including Bluetooth in a system that also includes 802.11g WiFi, where both use the same RF band, requires special attention to avoid RF interference. Bluetooth does include some modes to support lower power communication that may be used by Bluetooth peripherals to reduce power consumption. However, in a host system having WiFi, use of Bluetooth still requires an additional wireless subsystem.

While a wireless keyboard or mouse is not interesting as part of a network when it is not local to the host system, other devices, such as a Voice over IP (VoIP) telephone handset or a display screen may be useful both within and out of proximity of a host system. To work in a standard system, a WiFi VoIP telephone handset or a WiFi display screen needs to be part of the WiFi network and communicate directly with a router or access point. Similarly, if a WiFi keyboard or mouse were to be designed, the method to communicate with a host for a standard system would be to use the WiFi router or access point as an intermediary between the peripheral and the host. An embodiment of the invention enhances the WiFi subsystem in the host system, such that a host system can more directly support wireless peripheral devices in a special WiFi peripheral mode (WiFi-P). In some embodiments, the WiFi-P mode may provide software layers similar to Bluetooth services for managing host-to-peripheral communication including setup and security. In some embodiments, the communication between the WiFi host system and the WPD does not use standard IP protocols but instead utilizes a very efficient layer 2 communication scheme that is based on the MAC address of the WPD.

WiFi-P Keyboards and Mice

Keyboards and mice are low bandwidth data entry peripherals that lend themselves to be wireless because they are relatively low power so that they can run on batteries, and there is a user benefit in eliminating the wires that connect them to the host system. There is relatively little need to have a keyboard or mouse enabled as a full network device, so supporting a special peripheral mode where the keyboard and mouse are primarily utilized by a host system does not reduce their usefulness. In prior art systems, wireless keyboards and mice utilized either dedicated wireless links to the computer or utilized Bluetooth, thus requiring additional RF support in the host system.

Since the host system will typically require WiFi for network connectivity, it is useful to provide an ability for the host system to utilize WiFi peripherals such as a keyboard and mouse. A special peripheral mode is required so that the host system can operate in standard infrastructure mode, and maintain connectivity to the network while simultaneously supporting locally connected peripherals. WiFi Ad-Hoc mode is the conventional method for WiFi devices to communicate directly with each other. Ad-Hoc mode is undesirable in this situation, as a host system while operating in Ad-Hoc mode does not have network connectivity. WiFi-P mode allows the host system to maintain network connectivity while also supporting a wireless keyboard and mouse utilizing the same WiFi subsystem.

Since both keyboards and mice are low bandwidth devices, the communication between these WPDs and the host system may be optimized around preserving battery life and assuring that the latency is not too high. To preserve the battery life, the RF power levels can be kept low, provided they are high enough to cover the distance between the WPD and the host system. Other protocol techniques to lower the power are discussed below. Also, in some embodiments, the protocol can be kept very simple and does not need to utilize full IP packet based communication. A simpler lower level MAC address based protocol can be utilized.

WiFi-P VoIP Handset

A conventional Voice-over IP (VoIP) handset can be used to initiate and receive VoIP phone calls whenever such a device is included on a WiFi network. The WiFi-P mode may be added to a complete WiFi compatible VoIP handset, or a special reduced capability handset that includes only WiFi-P may be developed. The advantage of the WiFi-P mode is that it is a lower power mode for when the handset is within range of a host system.

WiFi-P Cell Phone Host System

Currently cell phones utilize Bluetooth for the wireless link to a phone headset. As cell phones incorporate WiFi for broadband and VoIP communication, the same WiFi subsystem can be used to support a WiFi-P phone headset. The advantage is that only one RF subsystem would be required in the cell phone. The software services on the cell phone could be the same as with the Bluetooth services where the management of the lower level network and radio could be managed transparently to the application.

WiFi-P Audio Headset

MP3 players connect with a host system utilizing either a wired or wireless connection. Some MP3 players have been designed with docking stations to allow connectivity over a standard network. Increasingly, it will be desirable to include network connectivity within the MP3 player itself. For a variety of reasons, that connectivity is likely to be WiFi based. Once the MP3 player includes a WiFi subsystem, it becomes possible to utilize that same WiFi subsystem to support a wireless audio headset.

Wireless headsets being constrained to be light means using smaller batteries, making it challenging to satisfy the power requirements for such a wireless headset. As such, supporting a Wi-Fi-P mode with lower power consumption is desirable.

WiFi-P Display System

Since the cost of a display screen is typically a large component of a display system, saving money on the wireless subsystem is not typically the first priority. However, achieving high quality for video playback may require managing Quality of Service (QoS) which may be better performed with a connection from the host to the display that does not necessarily traverse the entire network. As described below with reference to FIG. 3, a WiFi display system can make use of multiple wireless interfaces to achieve both portability and the highest display quality based on proximity to the host system and the other wireless access points of a system.

WiFi-P Notebook Wireless Docking Station

Another useful application is a wireless docking station for a notebook computer. Notebook computer docking stations often include wired connections for a network, keyboard, mouse, external monitor and other peripherals. Since the network is now often available as a wireless connection in an office or home, moving the other devices such as keyboard, mouse and monitor to also utilize wireless technology makes the concept of a wireless docking station more useful. When a notebook computer comes within range, the wireless monitor and keyboard could query the user whether he wanted to utilize the notebook. Then, without physically connecting the notebook to any devices, the notebook could be utilized by the wireless monitor and mouse. Additional technologies for connector-less power charging solutions could be combined so that a notebook, still in a briefcase, could be used in such a wireless docking station configuration. A variety of securing mechanisms could also be employed to prevent unauthorized access to the notebook computer.

WiFi-P for Media Base Station Host System

Current media base stations such as the Sony LF-X1 wireless television base stations utilize both a wired Ethernet and a wireless Ethernet connection for simultaneously supporting connectivity to the Internet and connectivity to a wireless peripheral "location free" television display. The Sony wireless peripheral location free display only works when in range of the media base station. Even though the media base station is part of the network, the media base station and the location free television display can not automatically switch to a network based connection when the location free television is out of range of the media base station. Only after the user manually configures the setup can the display access content from the base station over a network-based connection. The preferred operation of the display is to wirelessly connect directly to the wireless media base station when it is in range, and when it is not in range to automatically switch to a network based connection. In a preferred embodiment of the present invention, when a wireless display is out of wireless range of a media base station, but within range of another remote access point or connected to the network infrastructure via another means, the media base station uses the network infrastructure to provide the requested media to the wireless peripheral. The network infrastructure for such a path may require use of both wired and wireless links and as such the media base station may use the wired network infrastructure and act as the host to the wireless display whether the wireless display is within range of the media base station's WiFi connection or whether the hosting is performed over the network infrastructure.

The current media base station is required to utilize a wired Ethernet connection for access to the LAN. The WiFi subsystem can only be used for directly supporting the wireless display or where the media base station acts as an Access Point for other wireless devices. The wireless media base station is not able to utilize the WiFi RF subsystem for concurrent connectivity to the Internet and connectivity to the location free TV because it lacks support for a WiFi-P mode that allows simultaneous Internet access and support for a wireless peripheral. Adding WiFi-P mode to the wireless media base station would allow full wireless support where the media base station connects wirelessly to both the wireless location free display and the wireless infrastructure.

WiFi-P for Sensors

Current sensors are designed to support different RF sensor networks but typically not WiFi. For areas that have WiFi coverage, designing sensors to support WiFi-P mode may be a good approach. In this case, each sensor does not need to fully support the complete WiFi network stack, but may respond to or initiate communication with a WiFi based host system. In other sensor systems, the sensors may wish to be part of a secure WiFi network which requires the sensors to acquire a network key.

WiFi-P Authentication

An additional use for WiFi Peripheral Mode is as a means to authenticate an enrollee onto a secure WiFi network. A typical issue for secure networks is how to authenticate a new enrollee without creating a potential security hole that could be exploited to compromise the network. System security typically dictates that the authentication needs to occur prior to the enrollee having any access to the network. Without having access to the network, the authentication of a new enrollee needs to be performed "out of band"—meaning without use of the secure network. Typically, the authentication requires providing the enrollee with a key that will allow access to the network. Various prior art methods have been proposed for such a scheme including using USB for transferring the key, or requiring some type of user activation by manually coding in a pre-shared key such as with WiFi Protected Access Pre-Shared Key (WPA PSK) Mode. Some existing schemes involve the use of more than one key, where the first key gives limited access onto the network, and a second key is used as a unique identifier for the enrollee. Other multi-key schemes (such as Temporal Key Integrity Protocol (TKIP)) may also be used. The prior art means for initial key exchange, whether via USB, via manual keying or by using another out of band connection, adds user complications, may open security holes and may increase the system costs.

In one embodiment of this invention, WiFi Peripheral Mode can be used between the host and the enrollee as an out of band channel for the passing of key information for validating first time WiFi enrollees. The host system is first used to validate an enrollee. Then the host system requests a WiFi network key on behalf of the enrollee. The host system communicates with the enrollee using the WiFi RF subsystems of both the host and enrollee, but the initial providing of the key utilizes the WiFi Peripheral Mode and is "out of band." In order to maintain proper network security, the host system needs to validate the enrollee prior to providing the key. Once the host system provides the enrollee with the network key, the enrollee becomes capable of either operating via the host system in WiFi-P mode, or the enrollee becomes capable of utilizing the provided network key to independently operate on the secure WiFi network. In another embodiment, WiFi-P mode is used in conjunction with TKIP or with Robust Secure Network (RSN) procedures to allow out of band passing of key information.

As an example of an embodiment of this invention, a temperature sensor may be added as an enrollee to a secure WiFi network. The temperature sensor has a serial number but has no user interface and no input controls (except possibly an on-off switch and a reset means). The temperature sensor is turned on and its beacon is recognized by a host system. The beacon utilizes the WiFi RF subsystem, but since the sensor does not have a network key, the host system can only communicate with the sensor using an out of band WiFi RF based protocol. A user of the host system, where the host system may be a computer or some simplified management terminal with a display and simple I/O, validates that the enrollee beacon corresponds to the serial number of the physical sensor device. Once validated, the user initiates a request via the host system for the network to validate the new enrollee. The network provides the key for the enrollee to the host system via the secure WiFi channel. The host system then provides the key to the enrollee via the out of band WiFi peripheral channel. Once the enrollee receives the key, the enrollee may utilize the WiFi RF subsystem to communicate over the secure WiFi network.

WiFi-P Network Modes

As mentioned, WiFi Ad-Hoc mode is the conventional method for WiFi devices to communicate directly with each other. Ad-Hoc mode is undesirable in this situation since a host system in Ad-Hoc mode does not have network connectivity. WiFi-P mode allows the host system to maintain network connectivity while also supporting a wireless keyboard and mouse utilizing the same WiFi subsystem. When a host system operates in WiFi-P mode, access points that are unaware of the WiFi-P mode simply view the host system as operating in standard infrastructure mode. In the case of peripherals to the host system, the router and network infrastructure may be completely unaware of the peripheral devices, may view the peripheral devices as an extension of the host system capability, or may view the host system as providing Access Point capabilities to the peripherals.

Where the peripherals are designed to only communicate with the host system, the router and network infrastructure do not need to know about the peripherals and no services need to be provided to the peripherals. The communication between the peripherals and the host system operates in the WiFi-P mode which is effectively ignored by the network. Where the peripherals may both operate in direct communication with the host system and operate on the network itself, the router may provide basic services at initialization time of the device. For example, a Dynamic Host Configuration Protocol (DHCP) server may provide the peripheral device with an IP address for use on the network.

WiFi-P Protocols

As the WiFi specifications continue to evolve with new additions, capabilities for the WiFi host system and the WiFi infrastructure devices will continue to improve. Advances such as 802.11e for QoS and 802.11s for mesh support will enhance network capabilities. The WiFi-P mode also is designed to utilize ongoing advancements made in WiFi protocols. The WiFi-P mode can operate in any WiFi environment, although when there are fewer protocol options for the network, there may be less efficiency for the host-to-WPD communication.

In the simplest embodiment, the WPD includes a complete WiFi protocol stack and performs the required WiFi arbitration. In such a case, the AP, host system and WPD all need to run an interoperable WiFi protocol. The direct communication between the host system and the wireless peripheral utilizes the standard higher layer protocols that are part of the WiFi specification. Based on the distance between the WPD and the host system, the active power for the RF subsystem may be reduced to shorten the range. The additional optimizations for the communication between the peripheral device and the host system are to reduce the complexity of the WPD, reduce the power requirements of the WPD, and/or improve the QoS.

Even though the WPD communicates with the host system and not directly with the wireless network, all of the communication may be using the same or an overlapping WiFi RF channel. Even at lower active RF power levels, the chance exists for interference from using the same or an overlapping RF channel. Also, the host system may maintain its communication channel with the wireless network so it should not go "offline" while communicating with the WPD. With these constraints, the general methods to reduce the complexity of the wireless peripheral require that the host system perform the WiFi protocol arbitration so that the RF channel is clear for the wireless peripheral and host to communicate. With the host system managing the WiFi protocol arbitration, the WPD can essentially be in sleep mode until such time as it is in operation. The wake out of sleep mode can be initiated by either the WPD or the host system.

A general WiFi network controller 228 consists of an RF subsystem, a baseband subsystem (sometimes referred to as layer 2) and a MAC subsystem (sometimes referred to as layer 3). These layer references are not technically rigid. Other terms such as the PHY layer sometimes refer to both layer 1 and layer 2, and the MAC layer often includes functions of higher layers 4 and 5. In some systems utilizing existing technologies, albeit at a higher cost of implementation, the host system may have two non-overlapping RF channels active of which one can be used for accessing the WiFi network and the other can be used for accessing the WiFi peripheral devices. Depending on the controls available within the host system for the two channels, access to the two channels may be concurrently managed with different baseband controllers, or there may be some limitations to the ability for each channel to be used concurrently. A host system could also include two complete WiFi network controllers including the MAC where each operates on an different non-overlapping RF channel.

When the host system and the WPD communicate, since the host system has arbitrated for and controls the WiFi RF channel, the specific communication between the two can be very efficient. In a preferred embodiment, the WPD and host system use a very efficient protocol that operates below the conventional IP layer. This is sometimes called a layer 2 protocol. Instead of being based on IP addresses which are part of the network, such layer 2 protocols may be based on the unique MAC addresses of the devices. There are many ways to achieve the goal of efficient communications between the host system and WPDs and the preferred embodiments described here are just a few of the possibilities covered by the present invention.

For standardized communication between WiFi devices, the base WiFi MAC standard includes two channel access coordination functions. The simpler one is called Distributed Coordination Function (DCF) and the more complicated one is called Point Coordination Function (PCF). In the case of DCF, there is the least flexibility for the base system to provide enhanced communication between the host system and a peripheral device. However, there are a variety of QoS enhancements, as outlined in Berjano et. al's "MiFi: A Framework for Fairness and QoS Assurance in Current IEEE 802.11 Networks with Multiple Access Points" that can be utilized. In DCF mode, to support the WiFi-P mode, enhancements for supporting QoS may include one or a combination of the following techniques: modifying the DCF backoff mechanism, employing adaptive size for contention window, using different interframe spacing or various frame sizes. The WPD may wait for the host system to successfully arbitrate for the channel and then poll the WPD, or when the WPD has a pending request, it may then monitor the arbitration to determine when its host has arbitrated for a channel and initiate a request.

The PCF mode has a more robust mechanism using Contention Free Periods (CFPs) during which devices can be polled. During reserved timeslots within CFPs, the host system can more assuredly poll the WPD to either initiate a request or see if there are pending requests from the WPD. The PCF mode is an optional part of the 802.11g standard although with 802.11e there is a mandatory Hybrid Coordination Function (HCF) that provides a contention free polling mechanism much like the PCF mode. In all cases, the host system can only utilize the WiFi protocols that are available between the host system and the AP for gaining control of the channel although once the host system has the channel, the communication with the WPD may be more specific to the two devices.

Figure 2:
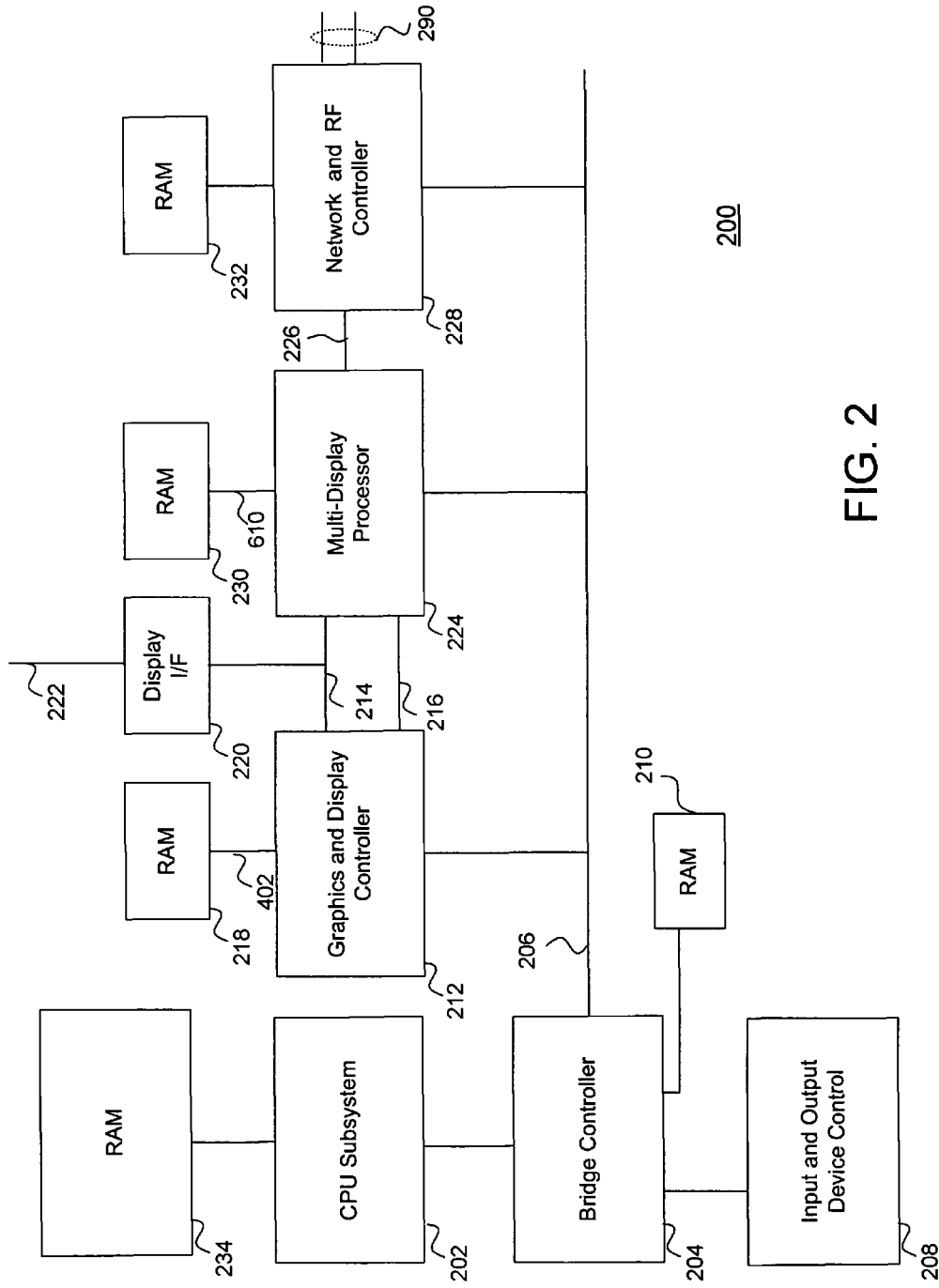
FIG. 2 is a block diagram of a host computer of a multi-display system in accordance with one embodiment of the invention.

FIG. 2 is a block diagram of a host computer 200 for a wireless peripheral system 100 in accordance with an embodiment of the invention. The basic components of host computer 200 preferably include, but are not limited to, a CPU subsystem 202, a bus bridge-controller 204, a main system bus 206 such as PCI express, local I/O 208, main RAM 210, and a graphics and display controller 212 having one or more dedicated output paths SDVO1 214 and SDVO2 216, and possibly its own memory 218. The graphics and display controller 212 may have an interface 220 that allows for local connection 222 to a local display 110. Host computer 200 also preferably includes a multi-display processor 224 that has both input paths SDV01 214 and SDV02 216 from the graphics and display controller 212 and an output path 226 to network controller 228. In addition to or instead of dedicated path 226, Multi-Display Processor 224 may be connected by the main system bus 206 to the Network Controller 228. The multi-display processor 224 may include a dedicated RAM 230 or may share main system RAM 210, graphics and display controller RAM 218 or network controller RAM 232. Those familiar with contemporary computer systems will recognize that the main RAM 210 may be associated more closely with the CPU subsystem 202 as shown at RAM 234. Alternatively the RAM 218 associated with the graphics and display controller 212 may be unnecessary as the host system 200 may share the main RAM 210.

Figure 8:
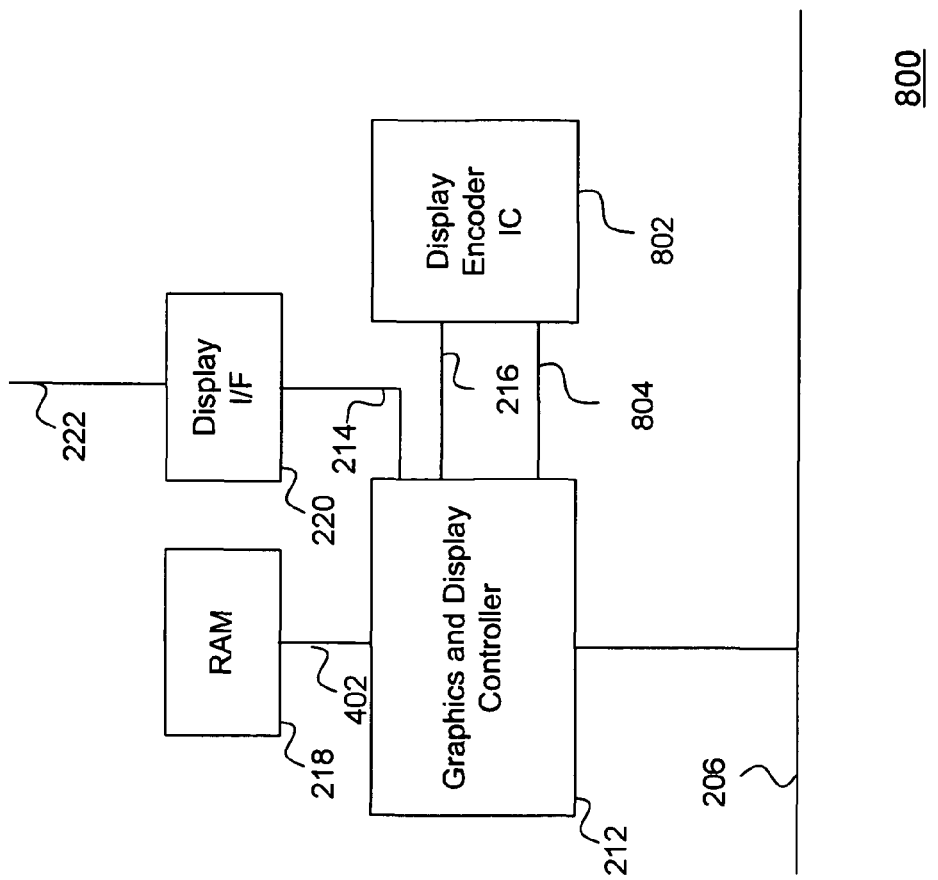
FIG. 8 is a block diagram of graphics and display system enhanced by combining a graphics and display controller with a display encoder.

The function of multi-display processor 224 is to receive one or more display refresh streams over each of SDVO1 214 and SDVO2 216, manage the individual display outputs, process the individual display outputs, track which portions of each display change on a frame-by-frame basis, encode the changes for each display, format and process what changes are necessary and then provide a display update stream to the network controller 228. The path from the multi-display processor 224 to the network controller 228 may be a direct connection 226 or a connection utilizing the main system bus 206, or the multi-display processor may feed the output back to an input port on the Graphics and Display Controller 212. In some configurations, the multi-display processor 224 does not need a connection to the main system bus 206 and all of its communications can be managed through the interfaces with the Graphics and Display Controller 212. The Graphics and Display Controller 212 may include a control bus (not shown) that can be used for programming the Multi-Display Processor 224 or the control information may be included as special control packets on the data transfer busses. The return path from the Multi-Display Processor 224 to the Graphics and Display Controller 212 may be part of a control path or may be another type of data port such as a parallel data input port, a serial data input port or some standard port such as an enhanced speed version of Consultative Committee on International Radio Standard 556 (CCIR656) or Digital Video Broadcast (DVB). FIG. 8 shows such a configuration where a Display Encoder IC 802 utilizes control and data bus 804 and does not include a connection to the main system bus 206.

Network and RF controller 228 processes the display update stream and provides the network communication over one or more network connections 290 to the various display devices. These network connections can be wired or wireless. In the case of wireless networks, a single network or a combination of wireless networks may be used. For example, host computer 200 may use UWB to wirelessly provide display data to one or more high resolution displays and may use WiFi to communicate with other peripherals.

The implementation and functionality of a multi-display system 100 are further discussed below in conjunction with FIGS. 3 through 10.

Figure 3:
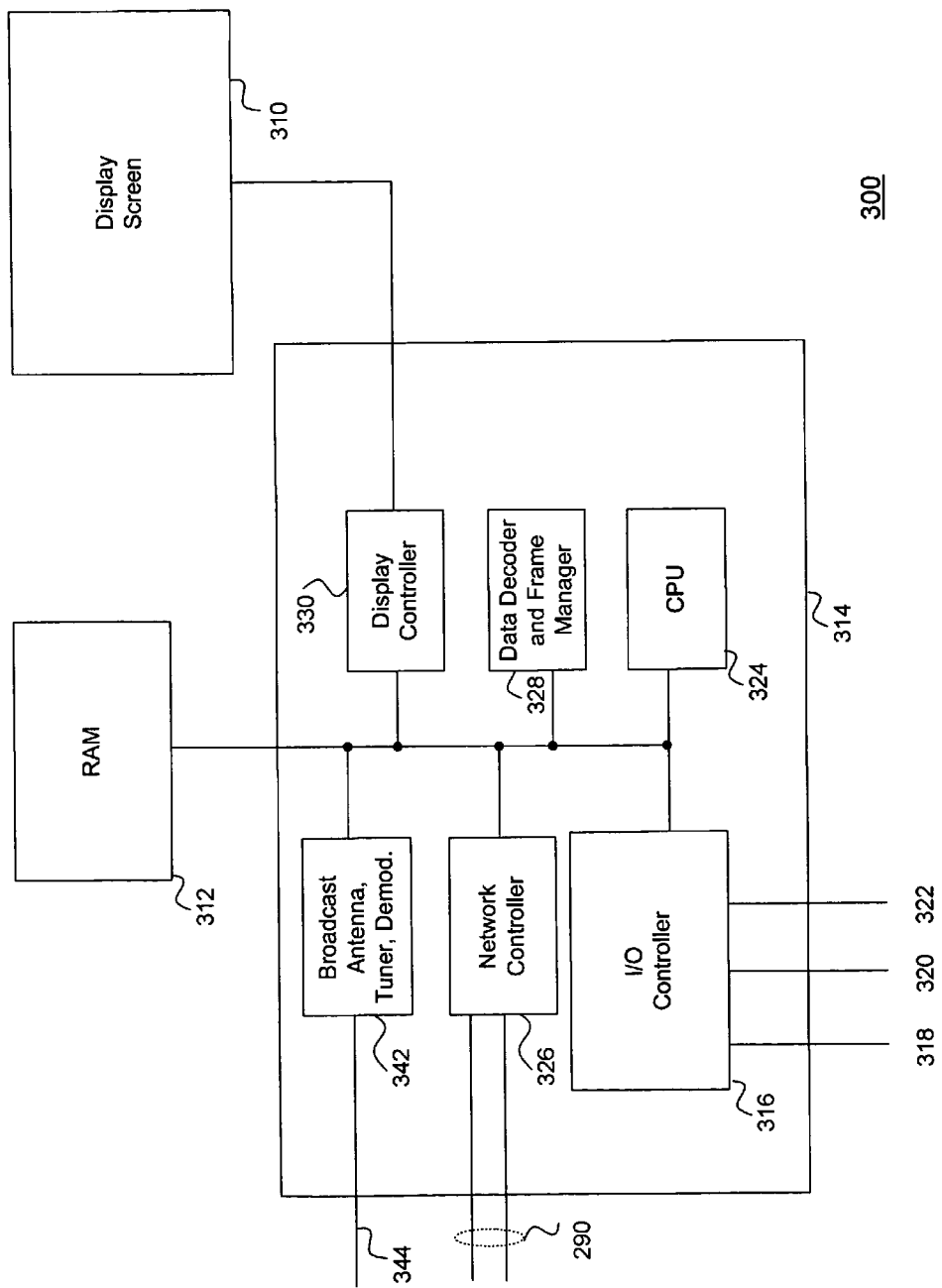
FIG. 3 shows a remote display corresponding to FIG. 2 in accordance with one embodiment of the invention.

FIG. 3 is a block diagram of a remote display system 300, in accordance with one embodiment of the invention, which preferably includes, but is not limited to, a display screen 310, a local RAM 312, and a remote display system controller 314. The remote display system controller 314 includes an I/O control subsystem 316 which has connections 318, 320 and 322 for devices that in some installations due to proximity do not connect directly to the host system. Such devices may include speakers for reproducing audio or a Universal Serial Bus (USB) connection which can support a variety of devices. The connections can be dedicated single purpose such as a PS/2 style keyboard or mouse connection, or more general purpose such as a USB. In another embodiment, the I/O could support a game controller, a local wireless connection, an IR connection or no connection at all. Remote display system 300 may also include other peripheral devices such as a DVD drive (not shown).

Also shown in FIG. 3 is an optional Broadcast Antenna, Tuner and Demodulation 342 subsystem with a connection 344 to an antenna (not shown). As a display device, it may be desirable for controller 314 to include the ability to directly receive broadcasts such as audio and video programming. The sources for such broadcasts may include Amplitude Modulation (AM) Radio, Frequency Modulation (FM) radio, digital radio, satellite radio, national Television Systems Committee (NTSC) television, Advanced Television Systems Committee (ATSC) Television, DVB-H or another form of Digital Video Broadcasting (DVB) television, cellular network based broadcasts, or a variety of other over the air broadcast transmissions. The information as to what is being tuned by this subsystem is made available to the CPU 324 and the software within the remote display system 300. This information can be relayed via the network controller 326 back to the host system 200. Some uses for such a relay are coordination of viewing preferences.

For example, a user may request to record a television broadcast based on viewing a DVB-H broadcast. Since the remote display system 300 does not include a record capability, that request is forwarded to the host system 200 to record the content. This can be done in a variety of ways including having the remote display system 300 stream the content to the host system 200 for recording, or the host system may record the content from another more local source, or the host may forward the request to another device on the network which is better suited for recording the content. The actual recording of the content may or may not be from the specific transmission type that the remote display system 300 first viewed the content with. For example, a satellite television based digital video recorder may record the same content in a high definition format even though the user selected the content based on viewing a standard definition terrestrial broadcast.

Some embodiments of the invention do not require any inputs at the remote display system 300. An example of such a system is a retail store or an electronic billboard where different displays are available at different locations and can show variety of informative and entertaining information. Each display can be operated independently and can be updated based upon a variety of factors. A similar system could also include some displays that accept touch screen inputs as part of the display screen, such as an information kiosk.

The remote display system may function as either a second display or as the primary display for a laptop PC. The laptop PC input may employ the keyboard and mouse that are an integrated part of the laptop PC, or an external keyboard and mouse that connect via USB, a proprietary RF solution, Bluetooth or WiFi. In the case of WiFi keyboards and mice, the WiFi peripheral mode described with reference to FIG. 1 can be used to allow the keyboard and mice to operate on batteries in a low power mode. Conserving battery power is a function of several factors including the active power usage while in operation, the standby power usage while not currently performing transfers, and a sleep mode while the device is in an inactive state.

A variety of network connectivity options may be supported by a remote display system 300. A common network example is Ethernet, such as CAT 5 wiring running some type of Ethernet, preferably gigabit Ethernet, where the I/O control path may use an Ethernet supported protocol such as standard Transport Control Protocol and Internet Protocol (TCP/IP), some form of lightweight handshaking in combination with User Datagram Protocol (UDP) transmissions, or a lower layer level 2 based MAC protocol. Also, a variety of wireless networking options may be supported. Referring back to FIG. 1, and considering the device labeled Wireless Peripheral 136 to be the remote display system 300 there may be a wireless path 108 directly to the host system 200, a wireless path 102 that utilizes WiFi Access Point 126, or wireless path 104 which connects to a "Remote" WiFi Access Point 120.

The wireless path 108 from the host system 200 to the wireless peripheral device 136 may be a standard WiFi link where the host system 200 acts as a link in a mesh or as an access point, it may be a dedicated wireless link which may utilize a separate WiFi channel or a different wireless standard such as Ultra Wide Band (UWB), or it may be a wireless link utilizing the WiFi-P mode. The wireless link, communication protocol and the video CODEC used can be dynamically determined based on the connections available. For example, while in close range, the host system 200 and the wireless peripheral device 136 may utilize UWB using a CODEC that matches the compression to the bandwidth available on the link. If the user moves the wireless peripheral device 136 out of range of the UWB connection, the wireless link may switch over to WiFi-P mode where the CODEC may require additional compression to fit the video transmission into the available bandwidth. The WiFi-P mode allows for some added QoS controls that may not be available when the WiFi access point 126 is included in the transfers. However, if the wireless peripheral device 136 is later out of range of the host system 200, but is still in range of the remote WiFi access point 120, then the communication link may use network protocols that are supported through the network infrastructure.

In each case, if the wireless peripheral device 136 includes a display, the network carries the encoded display data required for the display where the data decoder and frame manager 328 and the display controller 330 are used to support all types of visual data representations that may be rendered at the host computer 200 and display them locally on display screen 310.

The display controller 330, data decoder and frame manager 328, and CPU 324 work together to manage a representation of the current image frame in the RAM 312 and to display the image on the display 310. Typically, the image will be stored in RAM 312 in a format ready for display, but in systems where the RAM cost is an issue, the image can be stored in the encoded format. When stored in an encoded format, in some systems, the external RAM 312 may be replaced by large buffers within the remote display system controller 314.

After the display is first initialized, the host system 200 provides a full frame of data for decode and display over the network. Following that first frame of display data, the host system 200 need only send partial frame information over the network 290 as part of the display update network stream. If none of the pixels of a display are changed from the prior frame, the display controller 330 can refresh the display screen 310 with the prior frame contents from local storage 328. When partial frame updates are sent in the display update network stream, CPU 324 and display data decoder 328 perform the necessary processing steps to decode the image data and update the appropriate area of RAM 312 with the new image. During the next refresh cycle, the display controller 330 will use this updated frame for display screen 310. The processing for conversion and storage of the display update network stream is described in further detail with reference to FIGS. 4 through 10 below.

Figure 4:
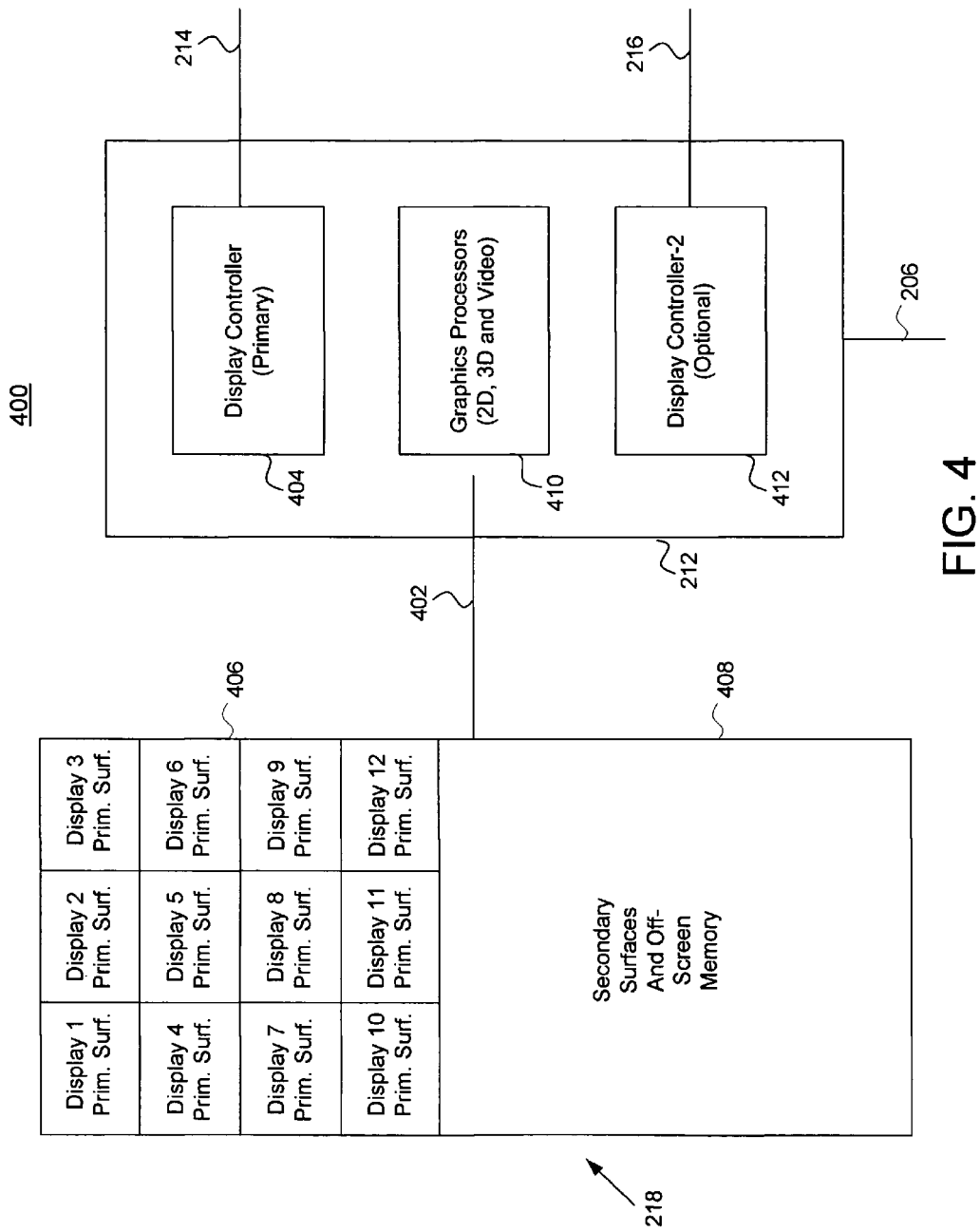
FIG. 4 represents a memory organization and the path through a dual display controller portion of a graphics and display controller in accordance with one embodiment of the invention.

An embodiment of host computer 200 may support multiple remote display systems 300, each of which may include a display system, utilizing what is conventionally associated with a single graphics and display controller 212 and a single SDVO connection. The method of multi-user and multi-display management is represented in FIG. 4 by RAM 218 data flowing through path 402 and the display controller-1 portion 404 of the graphics and display controller 212 to the output connections SDVO1 214 and SDVO2 216.

For illustration purposes, RAM 218 is shown organized into various surfaces each containing display data for multiple displays. The primary surfaces 406, Display 1 through Display 12, are illustrated with a primary surface resolution that happens to match the display resolution for each display. This is for illustrative purposes although there is no requirement for the display resolution to be the same resolution as that of the primary surface. The other area 408 of RAM 218 is shown containing secondary surfaces for each display and supporting off-screen memory. The RAM 218 will typically be a common memory subsystem for display and graphics subsystem 212, although the RAM may also be shared with main system memory 210 or with the memory of another processor in the system 100. In a shared memory system, contention may be reduced if there are available multiple concurrent memory channels for accessing the memory. The path 402 from RAM 218 to the graphics and display controller 212 may be time-shared.

The graphics and display controller 212's 2D, 3D and video graphics processors 410 are preferably utilized to achieve high graphics and video performance. The graphics processing units may include 2D graphics, 3D graphics, video encoding, video decoding, scaling, video processing and other advanced pixel processing. The display controllers 404 and 412 may also include processing units for performing functions such as blending and keying of video and graphics data, as well as overall screen refresh operations. In addition to the RAM 218 used for the primary and secondary display surfaces, there is sufficient off-screen memory to support various 3D and video operations. The display controllers will typically combine the primary surface with one or more secondary surfaces to support the display output of a composite frame, although it is also possible for the graphics processors 410 to perform the compositing into a single primary surface.

In a single-display system, display controller-1 404 would be configured to access RAM 218, process the data and output a proper display resolution and configuration over output SDVO1 214 for a single display device. Preferably, the display controller-1 404 is configured for a display size that is much larger than a single display to thereby accommodate multiple displays. Assuming the display controller-1 404 of a typical graphics and display controller 212 was not specifically designed for a multi-display system, the display controller-1 404 can typically only be configured for one display output configuration at a time. It may however be practical to consider display controller-1 404 to be configured to support an oversized single display as that is often a feature used by "pan and scan" display systems and may be just a function of setting the counters in the display control hardware.

In the illustration of FIG. 4, consider that each display primary surface represents a 1024×768 primary surface corresponding to a 1024×768 display. Stitching together six 1024×768 displays, three across and two down, would require display controller 212 to be configured to three times 1024, or 3072 pixels of width, by two times 768, or 1536 pixels of height. Such a configuration would accommodate Displays 1 through 6.

Display controller-1 404 would treat the six tiled displays as one large display and provide the scan line based output to SDVO1 output 214 to the multi-display processor 224. Where desired, display controller-1 404 would combine the primary and secondary surfaces for each of the six tiled displays as one large display. The displays labeled 7 through 12 could similarly be configured as one large display for display controller-2 412 through which they would be transferred over SDVO2 216 to the multi-display processor 224.

Figure 6:
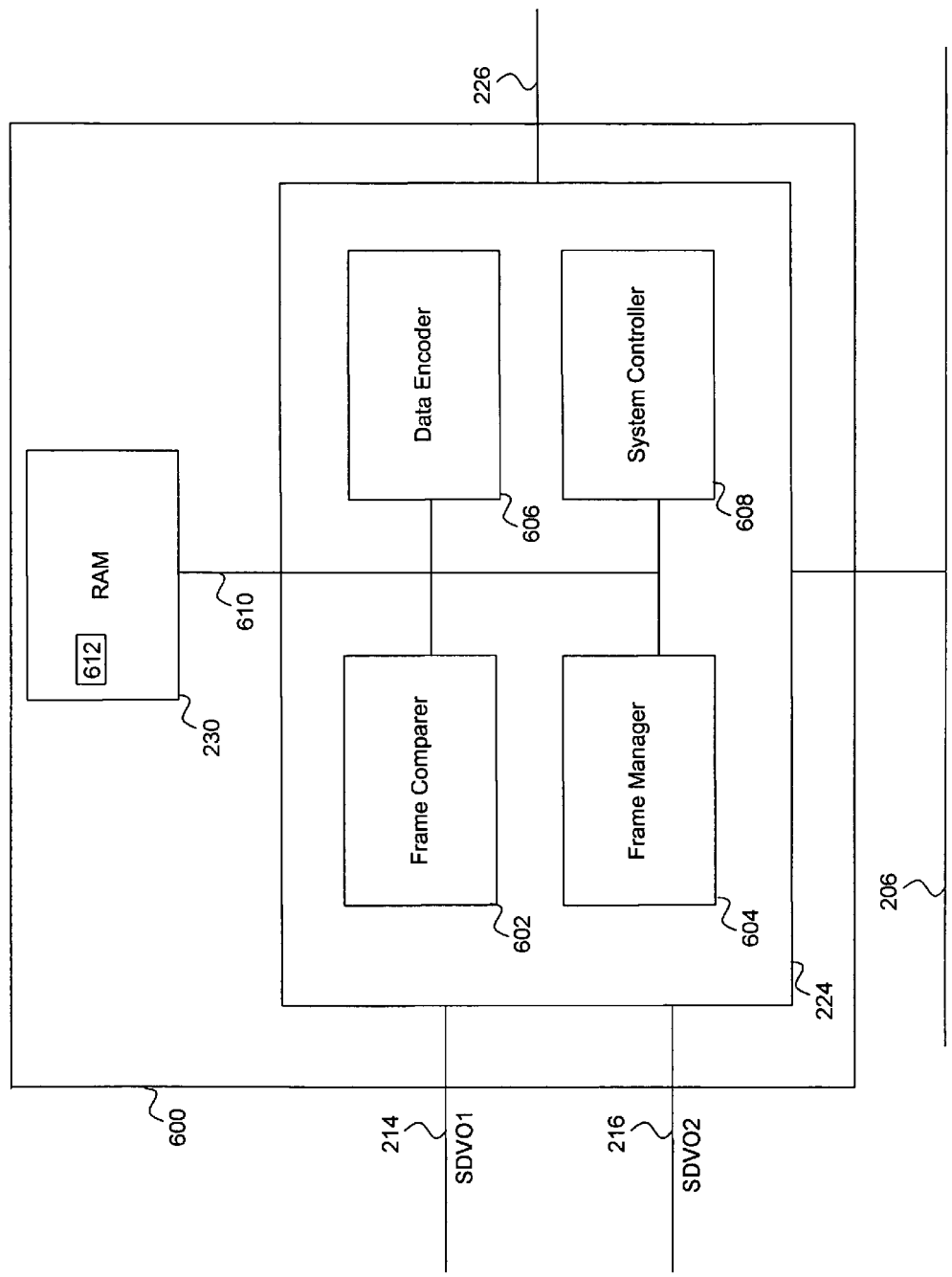
FIG. 6 shows a multi-display processor for the head end system of FIG. 2 in accordance with one embodiment of the invention.

In a proper configuration, FIG. 6 multi-display processor 224 manages the six simultaneous displays properly and process as necessary to demultiplex and capture the six simultaneous displays as they are received over SDVO1 214.

In the FIG. 4 primary surface 406, the effective scan line is three times the minimum tiled display width, making on-the-fly scan line based processing considerably more expensive. In a preferred environment for on-the-fly scan line based processing, the display controller-1 404 is configured to effectively stack the six displays vertically in one plane and treat the tiled display as a display of resolution 1024 pixels horizontally by six times 768, or 4608, pixels vertically. To the extent it is possible with the flexibility of the graphics subsystem, it is best to configure the tiled display in this vertical fashion to facilitate scan line based processing. Where it is not possible to configure such a vertical stacking, and instead a horizontal orientation needs to be included, it may be necessary to only support precinct based processing where on-the-fly encoding is not done. In order to minimize latency, when the minimum number of lines has been scanned, the precinct based processing can begin and effectively be pipelined with additional scan line inputs.

Figure 5:
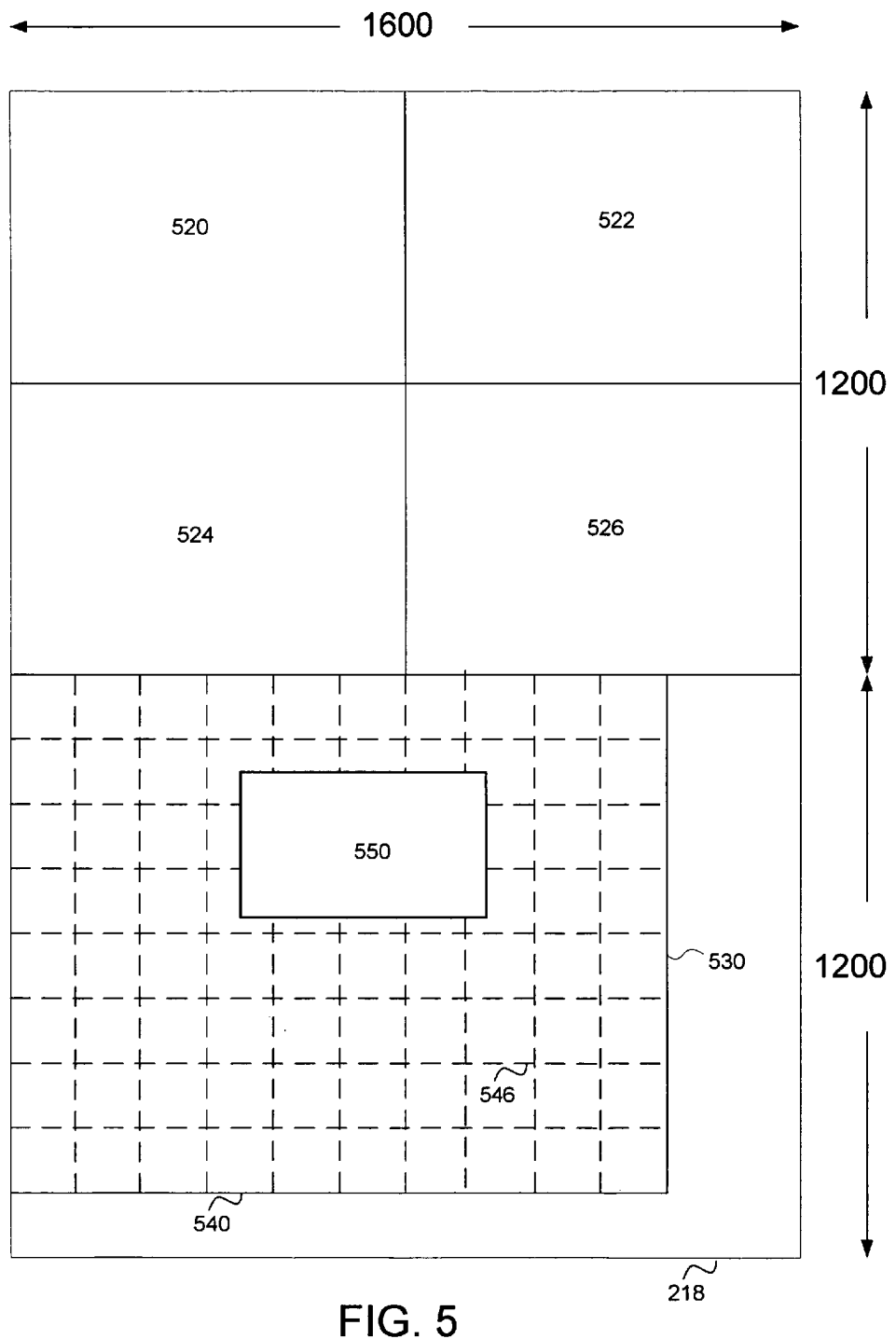
FIG. 5 represents a memory and display organization for various display resolutions in accordance with one embodiment of the invention.

FIG. 5 shows a second configuration where the tiled display is set to 1600 pixels horizontally and two times 1200 pixels or 2400 pixels vertically. Such a configuration would be able to support two remote display systems 300 of resolution 1600×1200 or eight remote displays of 800×600 or a combination of one 1600×1200 and four 800×600 displays. FIG. 5 shows the top half of memory 218 divided into four 800×600 displays labeled 520, 522, 524 and 526.

Additionally, the lower 1600×1200 area could be sub-divided to an arbitrary display size smaller than 1600×1200. As delineated with rectangle sides 530 and 540, a resolution of 1280×1024 can be supported within a single 1600×1200 window size. Because the display controller-1 404 is treating the display map as a single display, the full rectangle of 1600×2400 would be output and it would be the function of the multi-display controller 224 to properly process a sub-window size for producing the display output stream for the remote display system(s) such as system 300. A typical high quality display mode would be configured for a bit depth of 24 bits per pixel, although often the configuration may utilize 32 bits per pixel as organized in RAM 218 for easier alignment and potential use of the extra eight bits for other purposes when the display is accessed by the graphics and video processors. One example use of the extra bits may include hardware assisted tracking of which pixels or blocks of pixels have been changed.

FIG. 5 also illustrates the arbitrary placement of a display window 550 in the 1280×1024 display. The dashed lines 546 of the 1280×1024 display correspond to the precinct boundaries assuming 128×128 precincts. While in this example the precinct edges line up with the resolution of the display mode, such alignment is not necessary. As is apparent from display window 550 the alignment of the display window boundaries does not line up with the precinct boundaries. This is a typical situation as a user will arbitrarily size and position a window on a display screen. In order to support remote screen updates that do not require the entire frame to be updated, all of the precincts that are affected by the display window 550 need to be updated. Furthermore, the data type within the display window 550 and the surrounding display pixels may be of completely different types and not correlated. As such, the precinct based encoding algorithm, if it is lossy, needs to assure that there are no visual artifacts associated with either the edges of the precincts or with the borders of the display window 550. The actual encoding process may occur on blocks that are smaller, such as 16×16, than the precincts.

For Wavelet based encoding schemes, the process step most likely to cause visual differences between precincts or tiles for different frames of data is the Discrete Wavelet Transform (DWT) itself. One approach to avoid the visual differences is to perform the DWT on a larger tile or on the entire image for each frame. As will be explained in detail below, the DWT results for each precinct of each frame can be used to generate the signature for each precinct to determine if that precinct needs to be re-encoded. If the precinct signature has not changed from the prior frame, then no re-encoding is necessary. For precincts where the signature has changed, the precinct data is re-encoded. Comparing signatures after the DWT has an added benefit in the case where even if the frame data has not changed, but other parameters such as the compression ratio that would affect the encoded image have changed, the post DWT signature will have changed indicating that the data for that precinct, tile or frame needs to be resent. Of course there are a variety of conditions where the frame can be reset so that the entire frame image is updated.

The illustration of the tiled memory is conceptual in nature as a view from the display controller-1 404 and display controller-2 412. The actual RAM addressing will also relate to the memory page sizes and other considerations. Also, as mentioned, the memory organization is not a single surface of memory, but multiple surfaces, typically including an RBG surface for graphics, a YUV surface for video, and an area of double buffered RGB surfaces for 3D. The display controller combines the appropriate information from each of the surfaces to composite a single image. The compositing may also include alpha blending, transparency, color keying, overlay and other similar functions to combine the data from the different planes. In Microsoft Windows XP® terminology, the display can be made up of a primary surface and any number of secondary surfaces. The FIG. 4 sections labeled Display 1 through Display 12 can be thought of as primary surfaces 406 whereas the secondary surfaces 408 are managed in the other areas of memory. Surfaces are also sometimes referred to as planes.

The 2D, 3D and video graphics processors 410 would control each of the six displays independently with each possibly utilizing a windowed user environment in response to the display requests from each remote display system 300. This could be done by having the graphics and video operations performed directly into the primary and secondary surfaces, where the display controller-1 404 composites the surfaces into a single image. Another example is to primarily use the primary surfaces and to perform transfers from the secondary surfaces to the primary surfaces. As long as the transfers are coordinated to occur at the right times, adverse display conditions associated with non-double buffered displays can be minimized. The operating system and driver software may allow some of the more advanced operations for combining primary and secondary surfaces to not be supported by indicating to the software that such advanced functions, such as transparency, are not available.

In a typical prior art system, a display controller-1 404 would be configured to produce a refresh rate corresponding to the refresh rate of a local display. A typical refresh rate may be between 60 and 85 Hz although possibly higher and is somewhat dependent on the type of display and the phosphor or response time of the physical display elements within the display. Because the graphics and display controller 212 is split over a network from the actual display device 310, screen refreshing needs to be considered for this system partitioning.

Considering the practical limitations of the SDVO outputs from an electrical standpoint, a 1600×1200×24 configuration at 76 Hz is approximately a 3.5 Gigabits per second data rate. Increasing the tiled display to two times the height would effectively double the data and would require cutting the refresh rate in half to 38 Hz to still fit in a similar 3.5 Gigabits per second data rate. Because in this configuration the SDVO output is not directly driving the display device, the refresh requirements of the physical display elements of the display devices are of no concern. The refresh requirements can instead be met by the display controller 330 of the remote display controller 314.

Though not related to the refresh rate, the display output rate for the tiled display configuration is relevant to the maximum frame rate of new unique frames that can be supported and it is one of the factors contributing to the overall system latency. Since full motion is often considered to be 30 frames per second, the example configuration discussed here at 36 Hz could perform well with regard to frame rate. Other lower frame rates can also be supported even though they are not full motion. In general, the graphics and video drawing operations that write data into the frame buffer are not aware of the refresh rate at which the display controller is operating. Said another way, the refresh rate is software transparent to the graphics and video drawing operations.

Each display refresh stream output on SDV01 214 includes data to indicate which display is the target recipient of the update and where within the display (which precincts for systems that are precinct based) the new updated data is intended for, and includes the encoded data for the display.

Note that in FIG. 5, the window indicated by box 550 does not align with the drawn precincts and may or may not align with blocks of a block-based encoding scheme. Some encoding schemes will allow arbitrary pixel boundaries for an encoding subframe. For example, if the window 550 utilizes text and the encoding scheme utilized RLE encoding, the frame manager can set the sub-frame parameters for the window to be encoded to exactly the size of the window. When the encoded data is sent to the remote display system, it will also include both the window size and a window origin so that the data decoder and frame manager 328 can determine where to place the decoded data into a decoded frame.

If the encoding system used does not allow for arbitrary pixel alignment, then the pixels that extend beyond the highest block size boundary either need to be handled with a pixel-based encoding scheme, or the sub-frame size can be extended beyond the window 550 size. The sub-frame size should only be extended if the block boundary will not be evident by separately compressing the blocks that extend beyond the window.

Assuming window 550 is generated by a secondary surface overlay, the software tracking layer can be useful for determining when changes are made to subsequent frames. Even though the location of the secondary surface is known, because of various overlay and keying possibilities, the data to be encoded should come from a/the stage after the overlay and keying steps are performed by either one of the graphics engines or by the display processor.

FIG. 6 is a block diagram of the multi-display processor subsystem 600 which includes the multi-display processor 224 and the RAM 230 and other connections 206, 214, 216 and 226 from FIG. 2. The representative units within the multi-display processor 224 include a frame comparer 602, a frame manager 604, a data encoder 606, and system controller 608. These functional units are representative of the processing steps performed and could be performed by a multi-purpose programmable solution, a DSP or some other type of processing hardware.

Though the preferred embodiment is for multiple displays, for the sake of clarity, this disclosure will first describe a system with a single remote display screen 310. For this sample remote display, the remote display system 300, the graphics and display controller 212 and the multi-display processor 224 are all configured to support a common display format typically defined as a color depth and resolution. Configuration is performed by a combination of existing and enhanced protocols and standards including Digital Display Control (DDC), and Universal Plug and Play (uPNP), and utilizing the multi-display support within the Windows® or Linux® operating systems, and may be enhanced by having a management setup and control system application. Other newer standards such as Display Port and Unified Display Interface (UDI) have additional protocols to query and set up the display device.

The graphics and display controller 212 provides the initial display data frame over SDVO1 214 to the multi-display processor 224 where the frame manager 604 stores the data over path 610 into the user display portion 612 of memory 230. Frame manager 604 keeps track of the display and storage format information for the frames of display data. When the subsequent frames of display data are provided over SDVO1 214, the frame comparer 602 comparers the subsequent frame data to the just prior frame data already stored in RAM 230. The prior frame data is read from RAM over path 610. The new frame of data may either be compared as it comes into the system on path 214, or may be first stored to memory by the frame manager 604 and then read by the frame comparer 602. Performing the comparison as the data comes in saves the memory bandwidth of an additional write and read to memory and may be preferred for systems where memory bandwidth is an issue. This real time processing is referred to as "on the fly" and may be a preferred solution for reduced latency.

The frame compare step identifies which pixels and regions of pixels have been modified from one frame to the next. The comparison of frames is performed by either comparing the actual pixels or by comparing a signature of a region of pixels and the tracking of the changes from one frame to the next is typically performed at the higher region granularity. This higher granularity makes the management of the frame differences more efficient. In one embodiment, a fixed grid of 128×128 pixels, referred to as a precinct, may be used for tracking changes from one frame to the next. In other systems the precinct size may be larger or smaller, and instead of square precincts, the tracking can also be done on the basis of a rectangular region, scan line or a group of scan lines. The block granularity used for compression may be a different size than the precinct and they are somewhat independent although the minimum precinct size would not likely be smaller than the block size.

The frame manager 604 tracks and records which precincts or groups of scan lines of the incoming frame contain new information and stores the new frame information in RAM 230, where it may replace the prior frame information and as such will become the new version of prior frame information. Thus, each new frame of information is compared with the prior frame information by frame comparer 602. The frame manager 604 also indicates to the data encoder 606 and to the system controller 608 when there is new data in some of the precincts and which ones those precincts are. From an implementation detail, the new data may be double-buffered to assure that data encoder 606 accesses are consistent and predictable. In another embodiment where frames are compared on the fly, the data encoder may also compress data on the fly. This is particularly useful for scan line and multi-scan line based data compression.

For block based data encoding the data encoder 606 accesses the modified precincts of data from RAM 230, or large internal buffers, and compresses the data. System controller 608 keeps track of the display position of the precincts of encoded data and manages the data encoding such that a display update stream of information can be provided via the main system bus 206 or path 226 to the network controller.

Because the precincts may not correspond to any particular display surface, in the preferred embodiment any precinct can be independently encoded without concern for creating visual artifacts between precincts or on the edges of the precincts. However, depending on the type of data encoding used, the data encoder 606 may require accessing data beyond the changed precincts in order to perform the encoding steps. Therefore, in order to perform the processing steps of data encoding, the data encoder 606 may access data beyond just the precincts that have changed. Lossless encoding systems should not have a problem with precinct edges.

A further enhanced system does not need to store the full prior frame in order to compare on-the-fly. Consider a system that includes eight line buffers for the incoming data and contains storage for a signature associated with each eight lines of the display from the prior frame. A signature is a calculated number that is generated through some hashing of a group of data. While the original data can not be reconstructed from the signature, the same input data will always generate the same signature, whereas any change to any of the pixels of the input data will generate a different signature. Using 20 bits for a signature gives two raised to the twentieth power, or about one million, different signature possibilities. This means there would be about a one in a million chance of an incorrect match. The number of bits for the signature can be extended further if so desired.

The signature may be generated in conjunction with or separate from the path used for the encoding. As mentioned above, the signature generation may also be performed in conjunction with one of the steps of the encoding process such as using the DWT output for signature generation. In one implementation, each scan line is encoded on the fly using the prior seven incoming scan lines and the data along the scan line as required by the encoding algorithm. As each group of eight scan lines is received, the signature for that group is generated and compared to the signature of those same eight lines from the prior frame. If the signature of the new group of eight scan lines matches the signature of the prior frame's group of eight scan lines, then it can be safely assumed that there has been no change in display data for that group of scan lines, and the system controller 608 can effectively abort the encoding and generation and transmission of the display update stream for that group of scan lines. If after receiving the eight scan lines, the signatures for the current frame and the prior frame are different, then that block of scan lines contains new display data and system controller 608 will encode the data and generate the display update stream information for use by the network controller 228 in providing data for the new frame of a remote display.

The signature generation can be done with minimal buffering of the data where each pixel, or group of pixels, contributes to the signature and is no longer needed for the signature operation. However, the pixel data may still be needed if the pixels need to be encoded. Since the result of the signature will not be known until after the signature has been completed on the complete block of data, the incoming pixels cannot be discarded until the result of the signature comparison is known. The pixel data can be stored in buffer memory either on-chip or off-chip. In one optimization to conserve memory bandwidth, the pixels can be buffered on-chip and only if the signature does not match, then the pixels are transferred to the off-chip memory. The internal memory may be double buffered so that while the first buffer is being transferred to main memory for encoding, the second buffer is receiving the next group of pixels for the next signature operation.

In order to improve the latency, the encoding and signature generation and comparison may be partially overlapped or done in parallel. In one system the encoding of the data is performed from the pixels stored in an internal buffer memory. Such a system may use double or multi-way buffering with either line buffers or with another memory arrangement. As mentioned, one of the initial encoding processing steps may be used as part of the process for signature generation. If the original data will not be required for the full encoding, the resulting output of that initial processing step may be stored instead of the initial data.

When the prior frame data is not used in the encoding, the encoding step uses one of any number of existing or enhanced versions of known lossy or lossless two dimensional compression algorithms, including but not limited to Run Length Encoding (RLE), Wavelet Transforms, Discrete Cosine Transform (DCT), Vector Quantization (VQ) and Huffman Encoding. Different types of content benefit to different extents based on the chosen encoding scheme. For example, frames of video images contain varying colors but not a lot of sharp edges, which is fine for DCT based encoding schemes, whereas text includes a lot of white space between color changes but has very sharp edge transitions that need to be maintained for accurate representation of the original image and thus DCT would not be the most efficient encoding scheme. The amount of compression required will also vary based on various system conditions such as the network bandwidth available and the resolution of the display.

For systems that include the prior frame data as part of the encoding process, more sophisticated three dimensional compression techniques can be used where the third dimension is the time domain of multiple frames. Such enhancements for time processing include various block matching and block motion techniques which can differ in the matching criteria, search organization and block size determination.

While the discussion of FIG. 6 primarily described the method for encoding data for a single display, FIG. 6 also indicates a second display input path SDVO2 216 that can perform similar processing steps for a second display input from a graphics and display controller 212, or from a second graphics and display controller (not shown). An advanced graphics and display controller 212 is designed with dual SDVO outputs in order to support dual displays for a single user or to support very high resolution displays where a single SDVO port is not fast enough to handle the necessary data rate. The processing elements of the multi-display processor 224 including the frame comparer 602, the frame manager 604, the data encoder 606 and the system controller 608 can either be shared between the dual SDVO inputs, or a second set of the needed processing units can be included. If the processing is performed by a programmable DSP or Media Processor, either a second processor can be included or the one processor can be time multiplexed to manage both inputs.

The multi-display processor 224 outputs a display update stream to the FIG. 2 network controller 228 which in turn produces a display update network stream at one or more network interfaces 290. The networks may be of similar or dissimilar nature but through the combination of networks, each of the remote display systems, such as display system 300, is accessible. High speed networks such as Gigabit Ethernet are preferred but are not always practical. Lower speed networks such as 10/100 Ethernet, Power Line Ethernet, Coaxial cable based Ethernet, phone line based Ethernet or wireless Ethernet standards such as 802.11a, b, g, n, and future derivatives can also be supported. Other non-Ethernet connections are also possible and can include USB, 1394a, 1394b, 1394c or other wireless protocols such as Ultra Wide Band (UWB) or WiMAX.

The various supported networks can support a variety of transmission schemes. For example, Ethernet typically supports protocols such as standard Transport Control Protocol and Internet Protocol (TCP/IP), UDP, some form of lightweight handshaking in combination with UDP transmissions or a layer 2 based protocol. The performance of the network connection will be one of the critical factors in determining what resolution, color depth and frame rate can be supported for each remote display system 300. Depending on the constraints of the network environment, a proprietary protocol at an even lower level may be used. For example, a layer 2 protocol that does not use IP may perform an efficient transfer. Such a transfer may make use of the MAC addresses of the different devices. Special care needs to be taken with any routers and other network equipment to ensure such a scheme will work reliably in the network topology being used.

The remote display performance can be optimized by matching the network performance and the display encoding dynamically in real time. For example, if the network congestion on one of the connections for one of the remote display systems increases at a point in time, the multi-display processor can be configured dynamically to reduce the data created for that remote display. When such a reduction becomes necessary, the multi-display processor can reduce the display stream update data in various ways with the goal of having the least offensive effect on the quality of the display at the remote display system. Typically, the easiest adjustment is to lower the frame rate of display updates.

It is not typically possible or desirable to dynamically adjust the set-up of display resolution mode or display color depth mode of the remote display system as it would require a reconfiguration of the display and the user would clearly find such as adjustment objectionable. However, depending on the data encoding method used, the effective resolution and effective color depth within the existing display format can be adjusted without the need to reconfigure the display device and with a graceful degradation of the display quality.

Graceful degradation of this kind takes advantage of some of the characteristics of the human visual system's psychovisual acuity where, when there are more changes and motion in the display, the psycho visional acuity is less sensitive to the sharpness of the picture. For example, when a person scrolls through a text document, his eye cannot focus on the text as well as when the text is still, so that if the text blurred slightly during scrolling, it would not be particularly objectionable. Since the times of the most display stream updates correspond to the added motion on the display, it is at those times it may be necessary to reduce the sharpness of the transmitted data in order to lower the data rate. Such a dynamic reduction in sharpness can be accomplished with a variety of encoding methods, but is particularly well suited for Wavelet Transform based compression where the image is subband coded into different filtered and scaled versions of the original image.

Multi-display processor 224 will detect when a frame input over the SDVO bus intended for a remote display system is unchanged from the prior frame for that same remote display system. When the frame comparer 602 detects such a sequence of unchanged frames, the data encoder 606 does not need to perform any encoding for that frame, the network controller 228 will not generate a display update network stream for that frame, and the network bandwidth is conserved as the data necessary for displaying that frame already resides in the RAM 312 at the remote display system 300. Similarly, no encoding is performed and no network transmission is performed for identified precincts or groups of scan lines that the frame manager 604 and frame comparer 602 are able to identify as unchanged. However, in each of these cases, the data was sent over the SDVO bus and may have been stored and read from RAM 230.

These SDVO transmissions and RAM movements would not be necessary if the host computer 200 were able to track which display frames are being updated. Depending on the operating system it is possible for the CPU 202 to track which frames for which displays are being updated. There are a variety of software based remote display Virtual Network Computing (VNC) products which use software running on the host system CPU 202 to reproduce the look of the display of a computer and can support viewing from a different type of platform and over low bandwidth connections. While conceptually interesting, this approach does not mimic a real time response or support multi-media operations such as video and 3D that can be supported by this preferred embodiment. However, a preferred embodiment of this invention can use software, combined with the multi-display processor hardware, to enhance the overall system capabilities.

VNC systems typically perform the operations of the graphics drawing engines using software on the host system CPU 202 because utilizing the graphics and display controller 212 to perform the graphics drawing operations would then require the CPU 202 to read back the resulting frames from the RAM 218 which would typically be inefficient. In one preferred embodiment of this invention, the multi-display processor 224, through a combination of hardware and software, can perform the equivalent functions of the VNC encoding software and allow a VNC software client to remotely view the accelerated frame buffer output produced by graphics and display controller 212. VNC typically supports Hextile encoded, ZRLE encoded and raw non-encoded formats and may include 8, 64, 256 and full color options.

In some systems, the display encoding capabilities of the multi-display processor 224 may be integrated into the network controller 228 or into another part of the host system. As such, the display data ports 214 and 216 may not be available. In such a case, the main system bus 206 may be used to transfer the display frames or sub frames. The Graphics and Display Controller 212 would be configured to provide access to the display frame data or would transfer the display frame data to another part of the system over the main system bus 206. The display encoding function would then be performed on the display frame data by either dedicated hardware or a programmable processor. In one preferred embodiment of this invention, the network controller includes a programmable processor capable of performing the VNC Hextile, ZRLE and wavelet based encoding techniques. The Graphics and Display Controller 212 provides the display frame data either over the main system bus 206 or via a more dedicated bus 216. The processor within the network controller performs the display encoding and then via the network control functions provides the encoded display data to over a network to either a VNC client or to another remote display controller.

Various versions of Microsoft Windows® operating systems use Graphics Device Interface (GDI) calls for operations to the Graphics and Display Controller 212. Similarly, there are direct draw calls for controlling the primary and secondary surface functions, Direct 3D calls for controlling the 3D functions, and direct show calls for controlling the video playback related functions. Providing a tracking software layer that either intercepts the various calls, or utilizing other utilities within the display driver architecture, can enable the CPU subsystem 202 to track which frames of which remote display system are being updated. By performing this tracking, the CPU can reduce the need to send unchanged frames over the SDVO bus. It would be further advantageous if the operating system or device driver support provided more direct support for tracking which displays, which frames and which precincts within a frame had been modified. This operating system or device driver information could be used in a manner similar to the method described for the tracking software layer.

In a preferred embodiment, the CPU 202 can process data for more remote display systems than the display control portion of the graphics and display controller 212 is configured to support at any one time. For example, in the tiled display configuration for twelve simultaneous remote display systems of FIG. 4, additional displays could be swapped in and out of place of displays one through twelve based on the tracking software layer. If the tracking software detected that no new activity had occurred for display 5, and that a waiting list display 13 (not shown) had new activity, then CPU 202 would swap display 13 into the place of display 5 in the tiled display memory area. CPU 202 may use the 2D processor of the 2D, 3D and video graphics processors 410 to perform the swapping. A waiting list display 14 (not shown) could also replace another display such that the twelve shown displays are essentially display positions in and out of which the CPU 202 can swap an arbitrary number of displays. The twelve position illustration is arbitrary and the system 100 could use as few as one or as many positions as the mapping of the display sizes allows.

There are several considerations for using a tracking software layer for such a time multiplexing scheme. The display refresh operation of display controller-1 404 is asynchronous to the drawing by the 2D/3D and video processors 410 as well as asynchronous to the CPU 202 processes. This asynchronous nature makes it difficult for the multi-display processor 224 to determine from the SDVO data if a display in the tiled display memory is the pre-swap display or the post-swap display. Worse, if the swap occurred during the read out of the tiled display region being swapped, it would be possible for corrupted data to be output over SDVO. Synchronizing the swapping with the multi-display processor 224 will require some form of semaphore operation, atomic operation, time-coordinated operation or software synchronization sequence.

The general software synchronization sequence is to inform the multi-display processor 224 that the display in (to use the example just above) position 5 is about to be swapped and to not use the data from that position. The multi-display processor could still utilize data from any of the other tiled display positions that were not being swapped. The CPU 202 and 2D/3D and video processor 410 will update the tiled display position with the new information for the swapped display. CPU 202 then informs the multi-display processor 224 that data during the next SDVO tiled display transfer would be from the new swapped display and can be processed for the remote display system associated with the new data. Numerous other methods of synchronization, including resetting the display controller-1 404 to utilize another area of memory for the display operations, are possible to achieve swapping benefits of supporting more users than there are hardware display channels at any one time.

As described, it is possible to support more remote display systems 300 than there are positions in the tiled display 406. The synchronization operations will take away some of the potential bandwidth for display updates, but overall, the system will be able to support more displays. In particular, one could consider a system 100 where many remote displays have little or no activity. In another system, where many of the remote displays do require frequent updates, the performance for each remote display would be gracefully degraded through a combination of reduced frame rate and reducing the visual detail of the content within the display. If the system only included one display controller-1 404, the group of six displays, 1 through 6, could be reconfigured such that the display controller would utilize the display memory associated with the group of six displays 7 through 12 for a time, then be switched back.

The tiled method typically provides for the graphics and display controller 212 providing the multi-display processor 224 with the complete frame information for each tile. There is also the ability to provide sub-frame information via this tile approach provided that the sub-frame information relating to the position information of the subframe is also provided. In a sub-framed method, instead of a complete frame occupying the tile, a number of subframes that can fit are fit into the same area. Those sub-frames can all relate to one frame or relate to multiple frames.

Another method to increase the number of remote displays supported is to bank switch the entire tile display area. For example, tiles corresponding to displays 1 through 6 may be refreshed over the SDVO1 214 output while tiles corresponding to displays 7 through 12 are being drawn and updated. At the appropriate time, a bank switch occurs and the tiles for displays 7 through 12 become the active displays and tiles for displays 1 through 6 are then redrawn where needed. By switching all of the tiles in a bank at once, the number of synchronization steps may be fewer than by switching each display independently.

To recap, by configuring and combining at a system level, the graphics display controller 212 with a multi-display processor 224 is able to support configurations varying in the number of remote display systems, resolution and color depth for each display, and the frame rate achievable by each display. An improved configuration could include four or more SDVO output ports, and combined with the swapping procedure, could increase the ability of the system to support even more remote display systems at higher resolutions. However, increasing the overall SDVO bandwidth and using dedicated memory and swapping for the multi-display processor comes at an expense in both increased system cost and potentially increased system latency.

Figure 7:
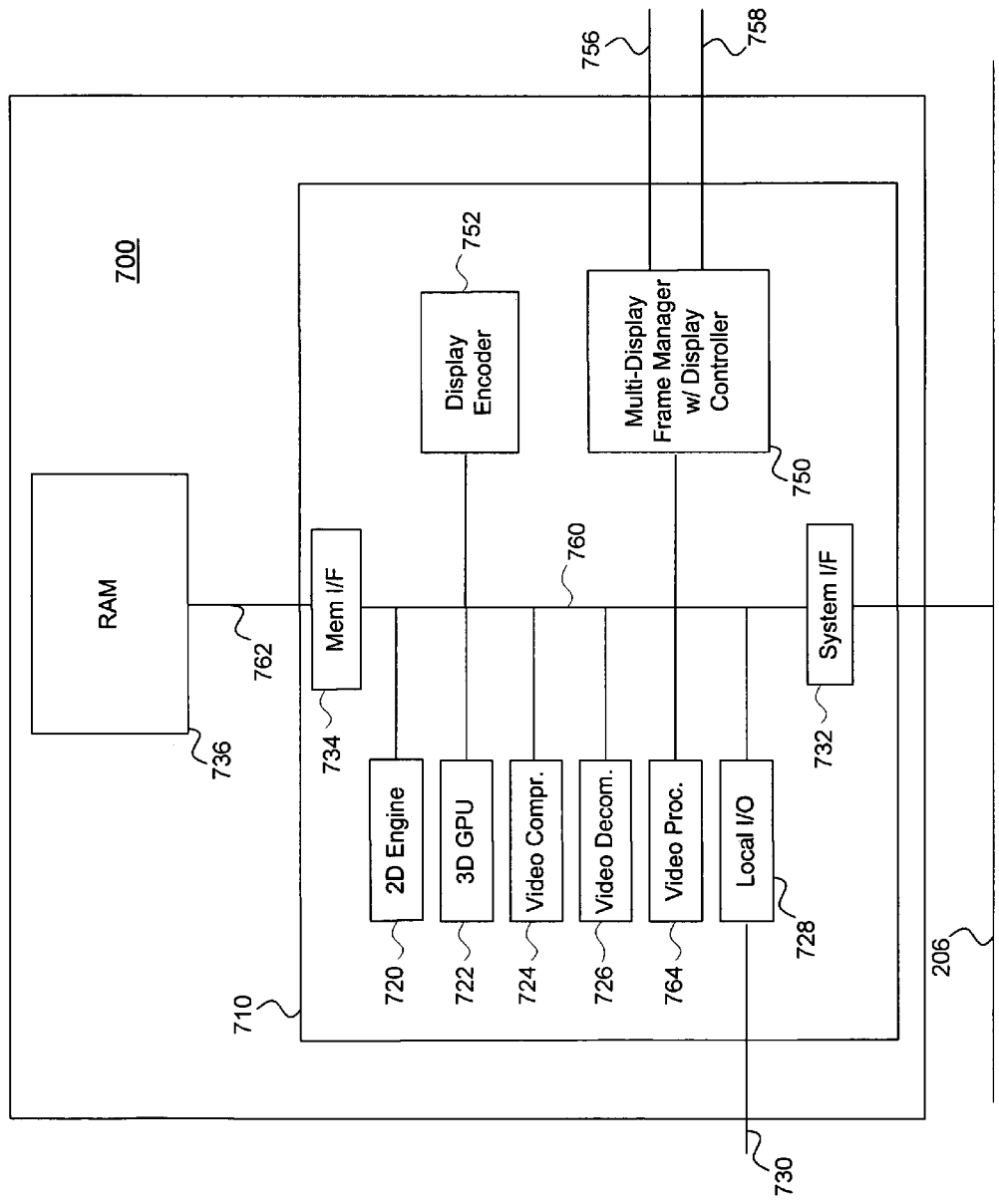
FIG. 7 is a block diagram of an exemplary graphics controller with an integrated multi-display support in accordance with one embodiment of the invention.

In an enhanced embodiment, not appropriate for all systems, it is desirable to combine the multi-display processor with the system's graphics and video display controller and share the same memory subsystem. FIG. 7 shows a preferred System-On-Chip (SOC) integrated circuit embodiment 700 that combines the multi-user display capabilities along with what is typically referred to as a graphics controller in a computer system. The combined graphics controller with integrated multi-display support 710 incorporates the functions of both graphics and display controller 212 and multi-display processor 224 and as such this combined SOC would also connect to main system bus 206 in the host computer 200 of a multi-display system 100 (FIG. 1).

In a preferred embodiment, the SOC graphics controller with integrated multi-display support 710 includes a 2D Engine 720, 3D Graphics Processing Unit (GPU) 722, a system interface 732 such as PCI express, control for local I/O 728 that can include interfaces 730 for video or other local I/O, such as a direct interface to a network controller, and a memory interface 734. Additionally, the graphics controller may include some combination of video compressor 724 and video decompression 726 hardware, or some form of programmable video processor 764 that combines those and other video related functions.

While an embodiment can utilize the software driven GPU and video processor approach for multi-display support as described above, the performance of the system as measured by the frame rates for the number of remote displays will be highest when using a graphics controller that includes a display subsystem optimized for multi-display processing. This further preferred embodiment 700 (FIG. 7) includes a multi-display frame manager with display controller 750 and a display data encoder 752 that compresses the display data. The multi-display frame manager with display controller 750 may include outputs 756 and 758 for local displays, although the remote multi-display aspects are supported over the system interface 732 or potentially a direct connection 730 to the network controller. The system bus 760 is illustrative of the connections between the various processing units as well as the system interface 732 and memory interface 734. The system bus 760 may include various forms of arbitrated transfers and may also have direct paths from one unit to another for enhanced performance.

The multi-display frame manager with display controller 750 supports functions similar to the FIG. 6 Frame Manager 604 and Frame Comparer 602 of multi-display processor 224. By way of being integrated with the graphics subsystem, some of the specific implementation capabilities improve, although the previously described functions of managing the multiple display frames in memory, determining which frames have been modified by the CPU, running various graphics processors and video processors, and managing the frames or blocks within the frames to be processed by the display data encoder 752 are generally supported.

In another embodiment of the present invention, the SOC graphics controller with integrated multi-display support 710 supports remote clients that utilize a VNC type interface. To provide such support, the display encoder 752 or another hardware block or CPU within integrated multi-display support 710 performs some or all of the encoding typically performed by the host CPU 210. An enhanced VNC client can utilize both the traditional VNC commands as well as include decoding support for encoding enhancements that are supported within SOC 710. Such an approach can allow both remote display systems 300 and remote PCs to perform remote computing tasks via the host system 200.

In the FIG. 2 multi-chip approach of host computer 200, the graphics and display controller 212 is connected via the SDVO paths to the multi-display processor 224, and each controller and processor has its own RAM system. Conversely, in FIG. 7 the graphics controller with integrated multi-display support 710 uses the shared RAM 736 connected by line 762 instead of the SDVO paths. Using the RAM 736 eliminates or reduces several bottlenecks in the system. First, the SDVO path transfer bandwidth issue is eliminated. Second, by sharing the memory, the multi-display frame manager with display controller 750 is able to read the frame information directly from the memory thus eliminating the read of memory by the graphics and display controller 212. For systems where the multi-display processor 224 was not performing operations on the fly, a write of the data into RAM is also eliminated.

Host computer 200 allows use of a graphics and display processor 212 that may have not been designed for a multi-display system. Since the functional units within the graphics controller with integrated multi-display support 710 may all be designed to be multi-display aware, additional optimizations can also be implemented. In a preferred embodiment, instead of implementing the multi-display frame support with a tiled display frame architecture, the multi-display frame manager with display controller 750 may be designed to map support for multiple displays that are matched as far as resolution and color depth in their corresponding remote display systems.

By more directly matching the display in memory with the corresponding remote display systems, the swapping scheme described above can be much more efficiently implemented. Similarly, the tracking software layer described earlier could be assisted with hardware that tracks when any pixels are changed in the display memory area corresponding to each of the displays. However, because a single display may include multiple surfaces in different physical areas of memory, a memory controller-based hardware tracking scheme may not be the most economical choice.

In one embodiment of the present invention where hardware assisted tracking is utilized, the 2D engine 720, the 3D GPU 722 and the other video units that might change the display pixels utilize a memory based bit scheme to set which pixels have been changed. The display encoder 752 can be used to reset the tracking bit each time the pixels have been encoded. This type of setting and resetting of a tracking bit can be combined with double buffering of surfaces. The tracking bits can be allocated for each pixel, or for a block of pixels. The bits can be stored in memory in proximity with the corresponding pixels or blocks of pixels, or a separate memory surface may be used for the tracking bits. The hardware utilized by the 3D GPU 722 for setting the Z-buffering bit depths or some other similarly designed hardware may be one way to implement such a hardware assisted tracking mechanism.

The tracking software layer can also be used to assist in the encoding choice for display frames that have changed and require generation of a display update stream. As discussed above the encoding is performed to reduce the data required for the remote display system 300 to regenerate the display data generated by the host computer's graphics and display controller 212. The tracking software layer can help identify the type of data within a surface where the display controller-1 404 translates the surface into a portion of the display frame. That portion of the display frame, whether precinct based or scan line based encoding is used, can be identified to the data encoder 606, or display data encoder 752, as to allow the most optimal type of encoding to be performed.

For example, if the tracking software layer identifies that a surface is real time video, then an encoding scheme more effective for video, which has smooth spatial transitions and temporal locality, can be used for those areas of the frame. If the tracking software layer identifies that a surface is mostly text, then an encoding scheme more effective for the sharp edges and the ample white space of text can be used. Identifying what type of data is in what region is a complicated problem. However, this embodiment of a tracking software layer allows an interface into the graphics driver architecture of the host display system and host operating system that assists in this identification. For example, in Microsoft Windows®, a surface that utilizes certain DirectShow commands is likely to be video data whereas a surface that uses color expanding bit block transfers (Bit Blits) normally associated with text, is likely to be text. Each operating system and graphics driver architecture will have its own characteristic indicators. Other implementations can perform multiple types of data encoding in parallel and then, based on encoder feedback, choose to use the encoding scheme that produces the best results.

Some types of encoding schemes are particularly more useful for specific types of data, and some encoding schemes are less susceptible to the type of data. For example, RLE is very good for text and very poor for video, DCT based schemes are very good for video and very poor for text, and wavelet transform based schemes can do a good job for both video and text. The VNC Hextile and ZRLE encoding techniques can be further combined with other encoding schemes for blocks that do not lend themselves to Hextile and ZRLE. For example, if a block can not be sufficiently encoded with Hextile, then that block may be encoded using a Wavelet based scheme. Although any type of lossless or lossy encoding can be used in this system, wavelet transform encoding, which also can be of a lossless or lossy type, for this application has been described in some detail. While optimizing the encoding based on the precinct is desirable, it can not be used where it will cause visual artifacts at the precinct boundaries or create other visual problems.

FIG. 8 shows a tightly coupled two chip implementation of a Graphics and Display Controller 212 utilizing an external Display Encoder Integrated Circuit (IC) 802. The Display Encoder IC 802 is coupled to the SDVO2 216 to receive uncompressed pixels into a pixel input port. The Display Encoder IC 802 then processes the pixels into an encoded form and outputs the encoded pixels on bus 804. Graphics and Display Controller 212 receives the encoded pixels over bus 804 to an input port. The bus may be a high speed serial bus, a parallel bus or a bus designed for another purpose that has adequate bandwidth to receive the encoded data. One example of such a bus is the CCIR656 bus which, when operated at an increased frequency, can be used for transferring the encoded data from the Display Encoder IC 802 to the Graphics and Display controller 212.

As described earlier with respect to the Multi-Display Processor 224 and the Display Encoder 752, the Display Encoder IC 802 may utilize a variety of internal buffering and external memory (not shown) schemes to perform a variety of encoding methods. The Graphics and Display Controller 212 may provide the non-encoded pixels over the SDVO2 216 output in a variety of configurations including scan line or block based. The control signal and format information may be communicated between the two chips 212 and 802 in a variety of ways including having the information embedded in the SDVO2 216 output stream, using a control protocol on either the SDVO2 line 216 or bus 804, or using a separate communication channel (not shown).

The Display Encoder IC 802 may have the full capabilities of the Multi-Display Processor 224 or of a subset of features of the Frame Comparer 602, Frame Manager 604, Data Encoder 606, and System Controller 608. Functions that are not included in the Display Encoder IC 802 may be managed by a combination of the main system CPU 202 and the Graphic and Display Controller 212. For example, the SDVO2 output may be managed to only transmit frames or tiles that have already been determined to be different from the prior frame or tile. As such, the Display Encoder IC 802 would not need to perform the functions of the Frame Comparer 602 or the Frame Manager 604. The Graphics and Display Controller 212, knowing which frames or tiles were transmitted to the Display Encoder IC 802, would know which encoded frames or tiles were being received.

The system 800 embodiment may be particularly well suited for a computer to support a second remote or wireless display system. In such an embodiment, the SDVO1 214 is connected to the internal display and the SDVO2 on line 216 output is used to support an external display. In one configuration, the external display output SDVO2 216 is encoded by the Display Encoder IC 802, provided over bus 804 back to the Graphics and Display controller 212, transferred over the system bus 206 and output over a network interface to a remote or wireless display system such as a large desktop LCD monitor that includes the necessary wireless and decoder subsystems such as described in system 300.

Figure 9A:
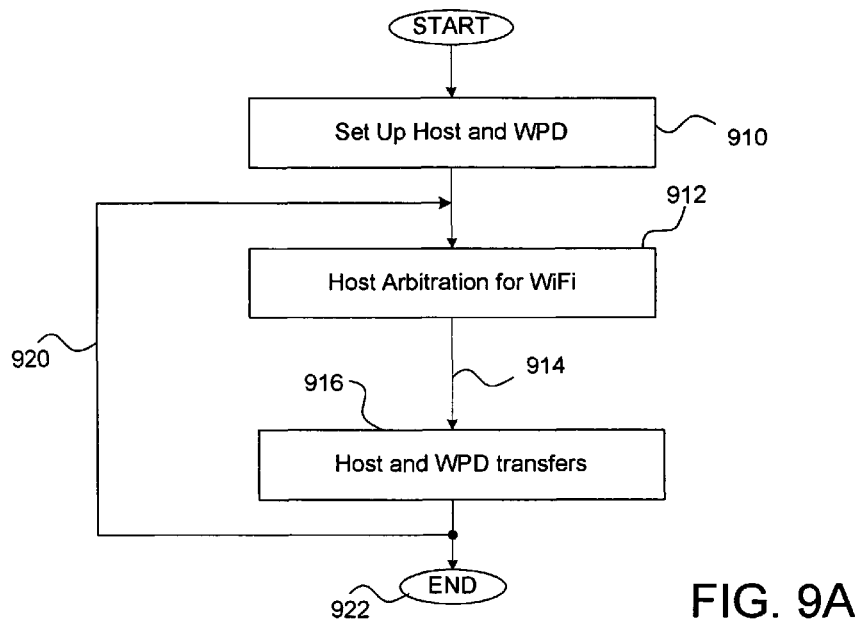
FIG. 9A is a flowchart of steps in a method for performing set up, arbitration and transfers with one embodiment of the invention.

FIG. 9A is a flowchart of method steps for performing one type of communication between the host system and a Wireless Peripheral Device (WPD). At the start, the host system is already part of the WiFi network and is in standard infrastructure mode. In this method, in step 910, the Host System and the WPD are set up and configured such that communication between the two will be possible in the network environment. The setup procedure may be automatic when the WPD powers on or may require putting the WPD into a special setup mode. The setup mode may be similar to the setup procedure performed by Bluetooth devices where one typically presses a "connect device" button on the peripheral and run a setup program on the host.

Unlike Bluetooth, which utilizes a different RF subsystem than the network infrastructure, the host system communicates with the WiFi peripheral device utilizing the same RF subsystem and RF spectrum as used for communicating with the network infrastructure. As such, in step 912, when the host initiates the setup procedure, it must first successfully arbitrate for the WiFi channel. Once the host has control of the WiFi channel, in step 916 the host can perform whatever reads and writes are required to perform the setup with the WPD and determine the profile and capabilities of the WPD. The setup procedure may also include added security steps of entering a code or another security step to assure that the WPD is the intended device. Part of the setup may result in the host system either learning the MAC address of the WPD or of the host system requesting an additional IP address from the network infrastructure, such as from the DHCP server, and relaying the assigned IP address to the WPD. In another setup procedure, once validated, the WPD is provided with the secure network key so that the WPD may access the secure network directly. Once the transfers between the host system and the WPD have been completed, or once the RF channel needs to be relinquished, the flowchart follows path 920.

Figure 9B:
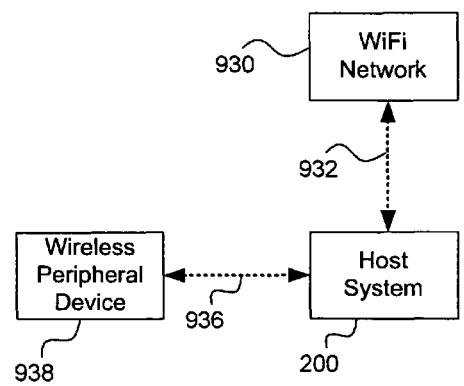
FIG. 9B represents the elements and communication channels corresponding to FIG. 9A with one embodiment of the invention.

FIG. 9B illustrates the communication path 932 between the WiFi network 930 and the Host System 200. Also shown is the communication path 936 between the WPD 938 and the Host System 200. As illustrated by this example, the communication between the WPD 938 and the WiFi Network 930 takes place with the Host System 200 acting as the intermediary. Referring back to the flow chart of FIG. 9A, step 912 host arbitration for WiFi may be indirectly initiated by the WPD 938 through either a predetermined time interval or from another means. The WPD 938 operation of FIGS. 9A and 9B is for a WPD that does not include the capability to directly interface to the WiFi network. Another type of WPD may also include a full or partial WiFi capability where the WPD may more directly participate in the WiFi network arbitration. Another type of WPD may fully function on the WiFi network when it is out of range of the Host System, but has another wired or wireless means to connect to the WiFi network.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

I claim:

1. A host system capable of supporting a first number of local display devices and an independent multiple second number of WiFi RF remote display systems, comprising:
   a graphics and display controller capable of supporting said first number of local display devices by supplying display sub frames via local display output paths and of supporting said multiple second number of WiFi RF remote display systems;
   a multi-display processor for simultaneously supporting said second number of WiFi RF remote display systems by receiving display sub frames from said graphics and display controller, and encoding said display sub frames by applying a compression algorithm that uses multiple frames;
   a frame compare function that detects when a given sub frame for a given remote display system is unchanged from a preceding sub frame for said given remote display system, and in response signals that said given sub frame does not need compression;
   a WiFi RF network controller that allows the host system to operate as a standard WiFi client on an infrastructure mode network, that utilizes only one standard infrastructure mode WiFi RF channel and does not switch said WiFi RF channel to standard WiFi ad-hoc mode or switch to utilizing a second RF channel, and that is used for selectively transmitting both
      to a WiFi router or access point using said one standard infrastructure mode WiFi RF channel and for maintaining network connectivity, and
      to said second number of WiFi RF remote display systems over a direct wireless connection using said standard infrastructure mode WiFi RF channel but without first transmitting said compressed sub frames in standard infrastructure mode; and
   means to connect said graphics and display controller, said multi-display processor, and said WiFi RF network controller to a CPU subsystem that is part of said host system.

2. The system of claim 1 wherein a specific code is entered at the host system to authenticate said second number of WiFi RF remote display systems during an authentication phase using said one standard infrastructure mode WiFi RF channel and without using either standard WiFi ad-hoc protocols or an access point.

3. A WiFi RF remote display system, which is for use with a host system that includes a physical WiFi RF network controller configured as an infrastructure mode WiFi client, which is capable of determining if said display system is within wireless range of said host system and which, when within wireless range of said host system, is accessible by said host system over a direct WiFi RF link utilizing a WiFi RF channel without using either a standard WiFi ad-hoc configuration or a standard WiFi network infrastructure, comprising:
   a physical wireless remote network controller which enables access to said WiFi RF network controller;
   a display data decoder that decompresses compressed data, received over said direct WiFi RF link, which may be for only a portion of a full frame; and
   a display controller for using a most recently reassembled frame of data from multiple transmissions of multiple sub frames to refresh a remote display screen;
   whereby said host system accesses said remote display system over said direct WiFi RF link, and said remote display screen displays an output of said host system, and wherein if said remote display system is not accessible over said direct WiFi RF link, then said remote display system is able to, over said standard WiFi network infrastructure utilizing said WiFi RF channel, access compressed and encoded data from said host system.

4. The system of claim 3 wherein said host system performs a discreet wavelet transform on each new sub frame, then generates a signature, and then compares the signature to a signature of a prior sub frame to determine if the new sub frame needs to be updated with a partial frame update over said WiFi direct link, and wherein said remote display system utilizes wavelet decoding techniques and displays the reassembled sub frame data from multiple frames each of which was encoded with different transform coefficients.

5. A method for operating a WiFi RF remote display system, comprising the steps of:
   receiving at said display system, from a host system which includes a single multi-display controller supporting multiple remote display systems and which is a client on a WiFi infrastructure network, display frames compressed and encoded by the host system;
   decoding information from the display frames; and
   using a single WiFi RF channel both for the WiFi infrastructure network and, aside from the infrastructure network but while maintaining network connectivity, for transmitting the encoded display frames from the host system directly to the WiFi RF remote display system, where neither the host system nor the remote display system uses standard WiFi ad-hoc mode for either an RF controller or on the WiFi RF channel.

* * * * *